United States Patent [19]
Du et al.

[11] Patent Number: 5,412,806
[45] Date of Patent: May 2, 1995

[54] CALIBRATION OF LOGICAL COST FORMULAE FOR QUERIES IN A HETEROGENEOUS DBMS USING SYNTHETIC DATABASE

[75] Inventors: Weimin Du, San Jose; Ravi Krishnamurthy, Cupertino; Ming-Chien Shan, Saratoga, all of Calif.

[73] Assignee: Hewlett-Packard Company, Palo Alto, Calif.

[21] Appl. No.: 932,426

[22] Filed: Aug. 20, 1992

[51] Int. Cl.$^6$ .................... G06F 15/16; G06F 15/403
[52] U.S. Cl. .................................. 395/600; 395/275; 395/200
[58] Field of Search ............... 395/600, 800, 275, 100, 395/155, 200

[56] References Cited

U.S. PATENT DOCUMENTS

| | | | |
|---|---|---|---|
| 4,531,186 | 7/1985 | Knapman | 395/600 |
| 4,769,772 | 9/1988 | Dwyer | 395/600 |
| 4,956,774 | 9/1990 | Shibamiya | 395/600 |
| 5,043,872 | 8/1991 | Cheng | 395/600 |
| 5,091,852 | 2/1992 | Tsuchida | 395/600 |

OTHER PUBLICATIONS

Chen et al, "Distributed Query Processing in a Multiple Database System", IEEE 1989, pp. 390-398.

*Primary Examiner*—Thomas G. Black
*Assistant Examiner*—Jean R. Homere

[57] ABSTRACT

A programmable machine system and method for managing electronic data access among multiple different relational databases in a network distributed database environment. The machine is programmed so that it can construct cost-effective access strategies for any of the participating databases absent any DBMS-specific cost models. The system provides query optimization across different database management systems in a network distributed database environment based on a calibrating database relying only on typical relational database statistics and cost data is developed by running queries in the various databases against the calibrating database. A logical cost model is constructed using the resulting cost data and is used to estimate the cost of a given query based on logical characteristics of the DBMS, the relations, and the query itself. The cost of a complex query is estimated using primitive queries. Optimal query access strategies are thereby designed and used to control execution of the queries across relational databases controlled by two or more different database management systems.

20 Claims, 17 Drawing Sheets

FIG. 4

| Calibration Queries for Table $R_n$ |  |
|---|---|
| 1. | select $C_1$ from $R_n$ where $C_1 = c$ |
| 2. | select $C_3$ from $R_n$ where $C_3 = c$ |
| 3. | select $C_4$ from $R_n$ where $C_4 = c$ |
| 4. | select $C_2$ from $R_n$ where $C_1 = c$ |
| 5. | select $C_2$ from $R_n$ where $C_3 = c$ |
| 6. | select $C_2$ from $R_n$ where $C_4 = c$ |
| 7. | select $C_2$ from $R_n$ where $C_2 < c$ |
| 8. | select $C_5$ from $R_n$ where $C_5 < c$ |
| 9. | select $C_6$ from $R_n$ where $C_6 < c$ |
| 10. | select $C_1$ from $R_n$ where $C_2 < c$ |
| 11. | select $C_1$ from $R_n$ where $C_5 < c$ |
| 12. | select $C_1$ from $R_n$ where $C_6 < c$ |

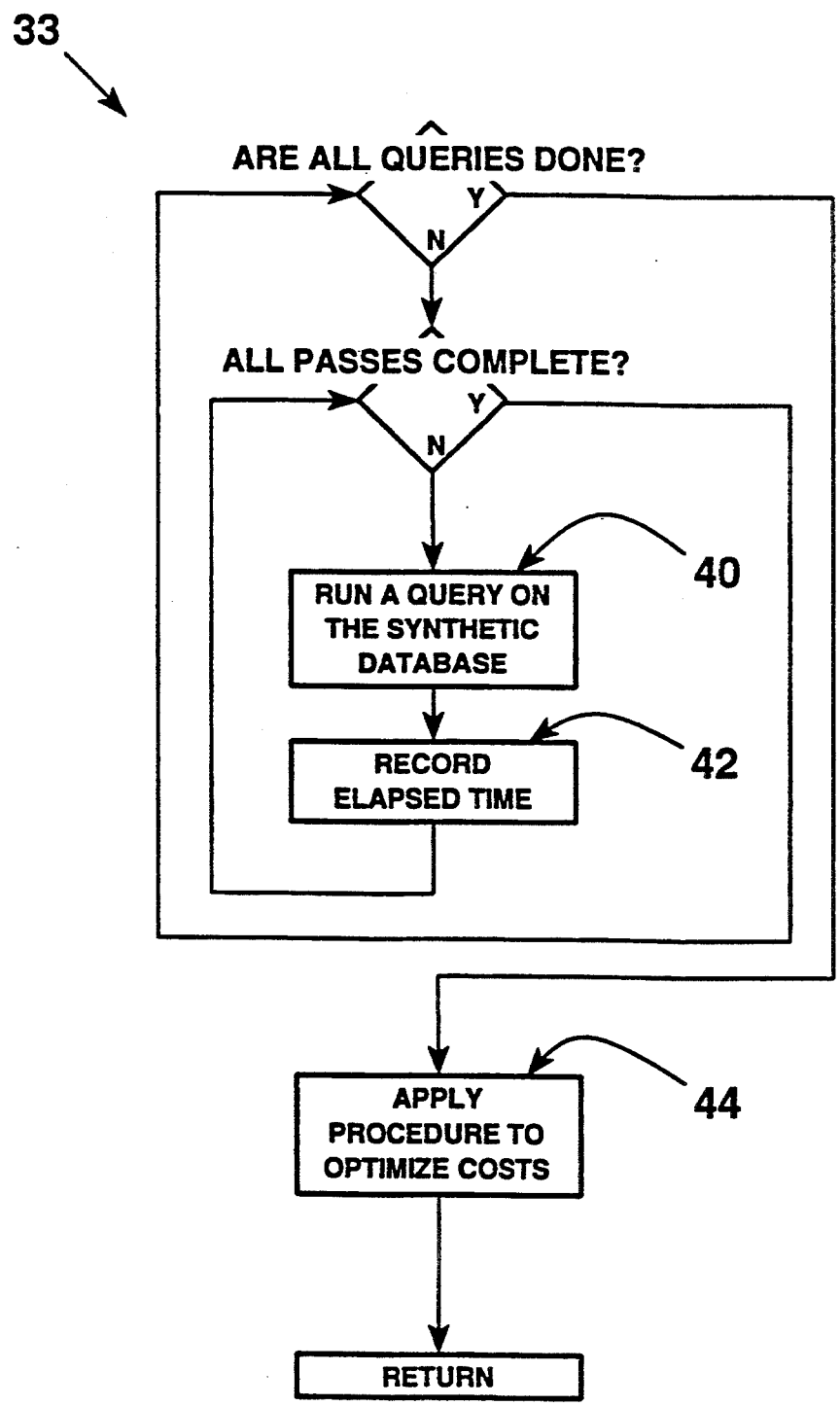

FIG. 6

The selection cost formulae are categorized as follows:

Sequential Scan: $CS_{ss} = CS0_{ss} + ((CS1_{ss}^{io} + CS1_{ss}^{cpu}) * N_1) + (CS2_{ss} * N_1 * N_2)$ Index-only Scan: $CS_{io} = CS_{io} + CS1_{io} + (CS2_{io} * N1 * S_1)$ Clustered Index Scan: $(CS_{ci} = CS0_{ci} + CS1_{ci} + (CS2_{ci} * N_1 * S_1)$ Unclustered Index Scan: $CS_{ui} = CS0_{ui} + CS1_{ui} + (CS2_{ui} * N_1 * S_1)$

Where,

$CS0_{xx}$   is the initialization cost for selects.

$CS1_{ss}^{io}$   is the amortized I/O cost of fetching each tuple of the relation, irrespective of whether the tuple is selected or not.

$CS1_{ss}^{cpu}$   is the CPU cost of processing each tuple of the relation.

$CS1_{io}$   is the cost of the initial index look-up.

$CS2_{ss}$   is the cost of processing a result tuple of the sequential scan.

$CS2_{io}$   is the cost of processing each tuple selected by an index. This includes the I/O cost to fetch tuples if necessary.

The join formulae are categorized as follows:

Nested Loop (if *sequential* scan on $r_2$):

$CJ_{nl} = CS_{xx}(r_1) + CS0_{ss}(r_2) + CS_{ss}^{io}(r_2) + (N_1 * S_1 * (CS_{ss}(r_2) - CS1_{ss}^{cpu}(r_2)))$

Nested Loop (if *index* scan on $r_2$):

$CJ_{nl} = CS_{xx}(r_1) + CS0_{ss}(r_2) + (N_1 * S_1 * (CS_{xx}(r_2) - CS0_{xx}(r_2)))$

Ordered Merge:

$CJ_{sm} = CJ1_{or}(r_1) + CJ1_{or}(r_2) + CS_{ss}(r_1) + CS_{ss}(r_2) + CJ2_{mg} * N_1 * N_2 * J_{12}$

Where,

$CJ1_{or}$   is the cost of ordering a relation. It may be zero if there is an index on the joining column.

$CJ2_{mg}$   is the cost of merging tuples.

FIG. 7

| C1 | C2 | C3 | C4 | C5 | C6 |
|----|----|----|----|----|----|
| 0  | 0  | 2  | 2  | 0  | 0  |
| 1  | 1  | 3  | 3  | 8  | 8  |
| 1  | 2  | 2  | 2  | 4  | 4  |
| 2  | 3  | 1  | 1  | 9  | 9  |
| 2  | 4  | 2  | 2  | 2  | 2  |
| 2  | 5  | 3  | 3  | 10 | 10 |
| 2  | 6  | 2  | 2  | 5  | 5  |
| 2  | 7  | 4  | 4  | 11 | 11 |
| 2  | 8  | 2  | 2  | 1  | 1  |
| 2  | 9  | 3  | 3  | 12 | 12 |
| 2  | 10 | 2  | 2  | 6  | 6  |
| 3  | 11 | 1  | 1  | 13 | 13 |
| 3  | 12 | 2  | 2  | 3  | 3  |
| 3  | 13 | 3  | 3  | 14 | 14 |
| 3  | 14 | 2  | 2  | 7  | 7  |
| 4  | 15 | 0  | 0  | 15 | 15 |

FIG. 8

- $C1[n,i] = \text{bell}(i)$, where $\text{bell}(0) = 0$, $\text{bell}(i) = k$ such that $$\sum_{j=0}^{k-1} f(j) < i+1 <= \sum_{j=0}^{k} f(j) \text{ and}$$

$$f(j) = \begin{cases} 1, & \text{if } j = 0; \\ 2, & \text{if } j = 1 \text{ and n is even}; \\ 4, & \text{if } j = 1 \text{ and n is odd}; \\ 4 * f(j-1), & \text{if } j <= \lfloor n/2 \rfloor; \\ f(j-1)/4, & \text{if } j > \lfloor n/2 + 1 \rfloor; \\ f(j-1)/2, & \text{if } j = \lfloor n/2 + 1 \rfloor; \end{cases}$$

- $C2[n,i] = i$

- $C3[n,i] = mf[j]$ such that $i \bmod 2^{j+1} = 2^j$ where $mf[j] = \lfloor n/2 \rfloor + (-1)^{j+1} \lfloor (j+1)/2 \rfloor$

- $C4[n,i] = C3[n,i]$

- $C5[n,i] = 2^{n-k} + j$ such that $i = 2^{k-1} * (1+2*j)$ and $C5[n,0] = 0$

| Relation Name | Relation Type | Size of Tuple | Cardinality of Relation |
|---|---|---|---|
| t1 | $R_{10}$ | 42 | $2^{10}$ |
| t2 | $R_{10}$ | 42 | $2^{10}$ |
| t3 | $R_{10}$ | 84 | $2^{10}$ |
| t4 | $R_{13}$ | 42 | $2^{13}$ |
| t5 | $R_{13}$ | 42 | $2^{13}$ |
| t6 | $R_{13}$ | 84 | $2^{13}$ |
| t7 | $R_{15}$ | 42 | $2^{15}$ |
| t8 | $R_{15}$ | 42 | $2^{15}$ |
| t9 | $R_{15}$ | 84 | $2^{15}$ |
| t10 | $R_{17}$ | 42 | $2^{17}$ |
| t11 | $R_{17}$ | 42 | $2^{17}$ |
| t12 | $R_{17}$ | 84 | $2^{17}$ |
| t13 | $R_{20}$ | 42 | $2^{20}$ |
| t14 | $R_{20}$ | 42 | $2^{20}$ |
| t15 | $R_{20}$ | 84 | $2^{20}$ |

FIG. 10

1.1.     select $C_1$ from $R_n$ where $C_1 = c$ 1.2.     select $C_3$ from $R_n$ where $C_3 = c$ 1.3.     select $C_4$ from $R_n$ where $C_4 = c$ 2.1.     select $C_2$ from $R_n$ where $C_1 = c$ 2.2.     select $C_2$ from $R_n$ where $C_3 = c$ 2.3.     select $C_2$ from $R_n$ where $C_4 = c$ 3.1.     select $C_2$ from $R_n$ where $C_2 < c$ 3.2.     select $C_5$ from $R_n$ where $C_5 < c$ 3.3.     select $C_6$ from $R_n$ where $C_6 < c$ 4.1.     select $C_1$ from $R_n$ where $C_2 < c$ 4.2.     select $C_1$ from $R_n$ where $C_5 < c$ 4.3.     select $C_1$ from $R_n$ where $C_6 < c$

FIG. 11

| Constant | Allbase | DB2 | Informix |
|---|---|---|---|
| $CS0_{ss}$ | 1.9 | 0.60 | 0.06 |
| $CS1_{ss}$ | $ts/10^5$ | $ts/1.4*10^6$ | $(168+ts)/7*10^5$ |
| $CS2_{ss}$ | 0.000175 | 0.0003 | 0.00045 |
| $CS0_{io}$ | 1.35 | 1.2 | 0.06 |
| $CS1_{io}$ | 0.0007 | 0.0003 | 0.001 |
| $CS2_{io}$ | 0.00036 | 0.0003 | 0.001 |
| $CS0_{ci}$ | 1.35 | 1.2 | 0.06 |
| $CS1_{ci}$ | 0.0007 | 0.0003 | 0.001 |
| $CS2_{ci}$ | 0.0007 | 0.0003 | 0.001 |
| $CS0_{ui}$ | 1.35 | 1.2 | 0.06 |
| $CS1_{ui}$ | 0.0007 | 0.0003 | 0.001 |
| $CS2_{ui}$ | .014-.024 | .007-.009 | .001-.002 |

FIG. 12A

1.1. select $R_n \cdot C_1, R_m \cdot C_1$ where $R_n \cdot C_1 = c$ & $R_n \cdot C_1 = R_m \cdot C_1$

1.2. select $R_n \cdot C_3, R_m \cdot C_3$ where $R_n \cdot C_3 = c$ & $R_n \cdot C_3 = R_m \cdot C_3$

1.3. select $R_n \cdot C_4, R_m \cdot C_4$ where $R_n \cdot C_4 = c$ & $R_n \cdot C_4 = R_m \cdot C_4$

1.4. select $R_n \cdot C_4, R_m \cdot C_1$ where $R_n \cdot C_4 = c$ & $R_n \cdot C_4 = R_m \cdot C_1$

1.5. select $R_n \cdot C_4, R_m \cdot C_3$ where $R_n \cdot C_4 = c$ & $R_n \cdot C_4 = R_m \cdot C_3$

1.6. select $R_n \cdot C_1, R_m \cdot C_4$ where $R_n \cdot C_1 = c$ & $R_n \cdot C_1 = R_m \cdot C_4$

1.7. select $R_n \cdot C_1, R_m \cdot C_3$ where $R_n \cdot C_1 = c$ & $R_n \cdot C_1 = R_m \cdot C_3$

1.8. select $R_n \cdot C_3, R_m \cdot C_1$ where $R_n \cdot C_3 = c$ & $R_n \cdot C_3 = R_m \cdot C_1$

1.9. select $R_n \cdot C_3, R_m \cdot C_4$ where $R_n \cdot C_3 = c$ & $R_n \cdot C_3 = R_m \cdot C_4$

2.1. select $R_n \cdot C_2, R_m \cdot C_2$ where $R_n \cdot C_1 = c$ & $R_n \cdot C_1 = R_m \cdot C_1$

2.2. select $R_n \cdot C_2, R_m \cdot C_2$ where $R_n \cdot C_3 = c$ & $R_n \cdot C_3 = R_m \cdot C_3$

2.3. select $R_n \cdot C_2, R_m \cdot C_2$ where $R_n \cdot C_4 = c$ & $R_n \cdot C_4 = R_m \cdot C_4$

2.4. select $R_n \cdot C_2, R_m \cdot C_2$ where $R_n \cdot C_4 = c$ & $R_n \cdot C_4 = R_m \cdot C_1$

2.5. select $R_n \cdot C_2, R_m \cdot C_2$ where $R_n \cdot C_4 = c$ & $R_n \cdot C_4 = R_m \cdot C_3$

2.6. select $R_n \cdot C_2, R_m \cdot C_2$ where $R_n \cdot C_1 = c$ & $R_n \cdot C_1 = R_m \cdot C_4$

2.7. select $R_n \cdot C_2, R_m \cdot C_2$ where $R_n \cdot C_1 = c$ & $R_n \cdot C_1 = R_m \cdot C_3$

2.8. select $R_n \cdot C_2, R_m \cdot C_2$ where $R_n \cdot C_3 = c$ & $R_n \cdot C_3 = R_m \cdot C_1$

2.9. select $R_n \cdot C_2, R_m \cdot C_2$ where $R_n \cdot C_3 = c$ & $R_n \cdot C_3 = R_m \cdot C_4$

FIG. 12B 3.1. select $R_n \cdot C_2, R_m \cdot C_2$ where $R_n \cdot C_2 < c$ & $R_n \cdot C_2 = R_m \cdot C_2$ 3.2. select $R_n \cdot C_5, R_m \cdot C_5$ where $R_n \cdot C_5 < c$ & $R_n \cdot C_5 = R_m \cdot C_5$ 3.3. select $R_n \cdot C_6, R_m \cdot C_6$ where $R_n \cdot C_6 < c$ & $R_n \cdot C_6 = R_m \cdot C_6$ 3.4. select $R_n \cdot C_6, R_m \cdot C_2$ where $R_n \cdot C_6 < c$ & $R_n \cdot C_6 = R_m \cdot C_2$ 3.5. select $R_n \cdot C_6, R_m \cdot C_5$ where $R_n \cdot C_6 < c$ & $R_n \cdot C_6 = R_m \cdot C_5$ 3.6. select $R_n \cdot C_2, R_m \cdot C_6$ where $R_n \cdot C_2 < c$ & $R_n \cdot C_2 = R_m \cdot C_6$ 3.7. select $R_n \cdot C_2, R_m \cdot C_5$ where $R_n \cdot C_2 < c$ & $R_n \cdot C_2 = R_m \cdot C_5$ 3.8. select $R_n \cdot C_5, R_m \cdot C_2$ where $R_n \cdot C_5 < c$ & $R_n \cdot C_5 = R_m \cdot C_2$ 3.9. select $R_n \cdot C_5, R_m \cdot C_6$ where $R_n \cdot C_5 < c$ & $R_n \cdot C_5 = R_m \cdot C_6$ 4.1. select $R_n \cdot C_1, R_m \cdot C_1$ where $R_n \cdot C_2 < c$ & $R_n \cdot C_2 = R_m \cdot C_2$ 4.2. select $R_n \cdot C_1, R_m \cdot C_1$ where $R_n \cdot C_5 < c$ & $R_n \cdot C_5 = R_m \cdot C_5$ 4.3. select $R_n \cdot C_1, R_m \cdot C_1$ where $R_n \cdot C_6 < c$ & $R_n \cdot C_6 = R_m \cdot C_6$ 4.4. select $R_n \cdot C_1, R_m \cdot C_1$ where $R_n \cdot C_6 < c$ & $R_n \cdot C_6 = R_m \cdot C_2$ 4.5. select $R_n \cdot C_1, R_m \cdot C_1$ where $R_n \cdot C_6 < c$ & $R_n \cdot C_6 = R_m \cdot C_5$ 4.6. select $R_n \cdot C_1, R_m \cdot C_1$ where $R_n \cdot C_2 < c$ & $R_n \cdot C_2 = R_m \cdot C_5$ 4.7. select $R_n \cdot C_1, R_m \cdot C_1$ where $R_n \cdot C_2 < c$ & $R_n \cdot C_2 = R_m \cdot C_6$ 4.8. select $R_n \cdot C_1, R_m \cdot C_1$ where $R_n \cdot C_5 < c$ & $R_n \cdot C_5 = R_m \cdot C_2$ 4.9. select $R_n \cdot C_1, R_m \cdot C_1$ where $R_n \cdot C_5 < c$ & $R_n \cdot C_5 = R_m \cdot C_6$

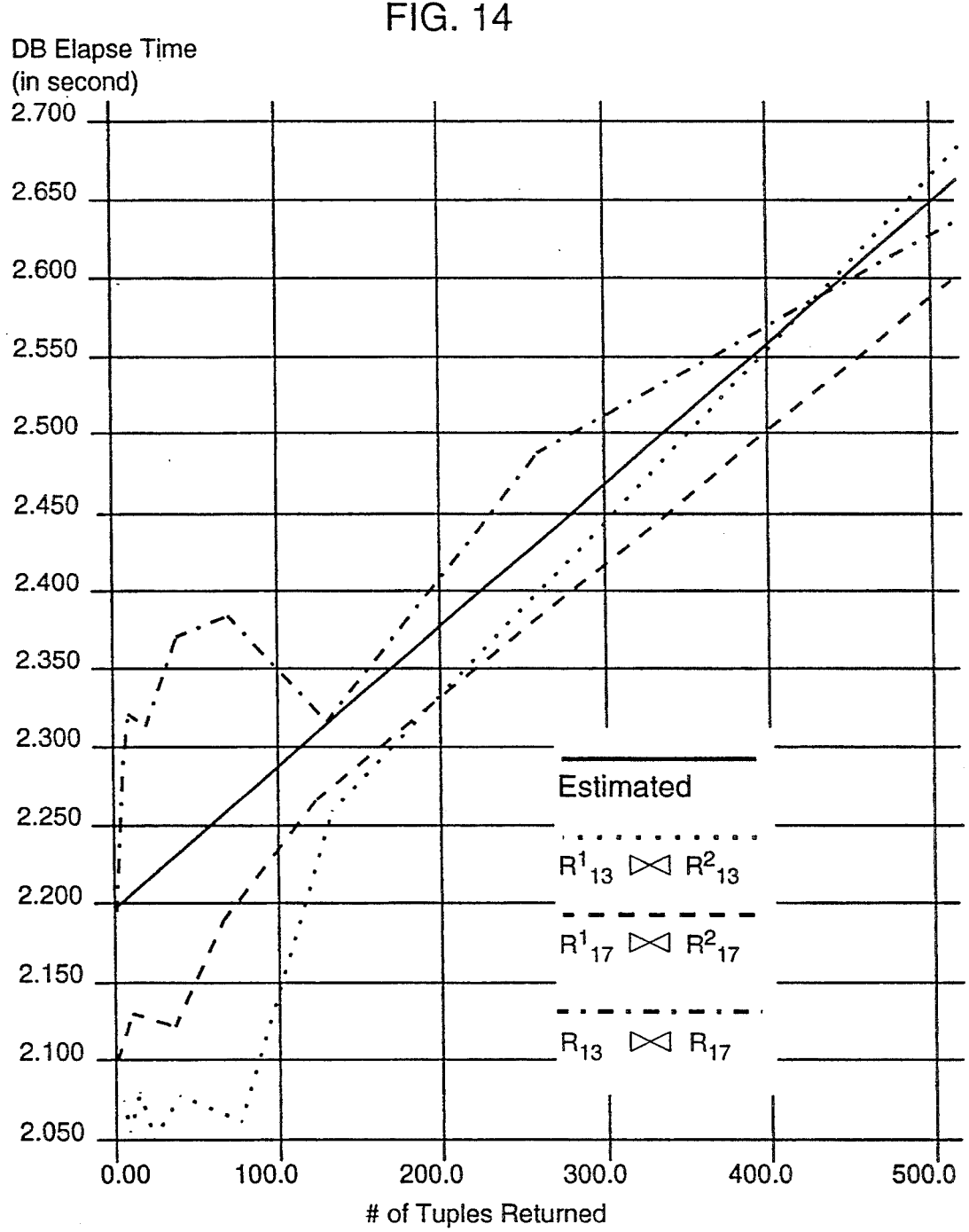

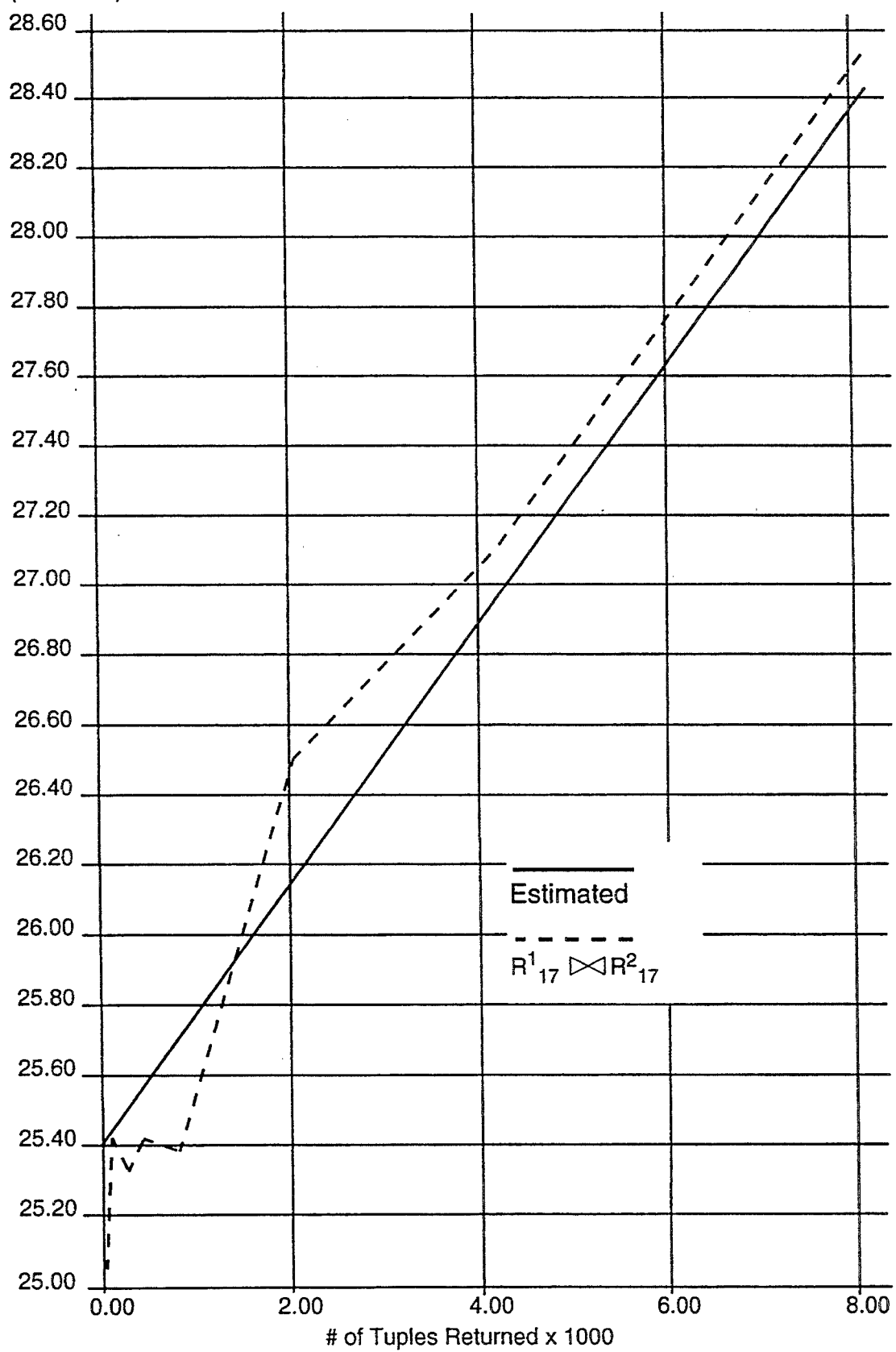

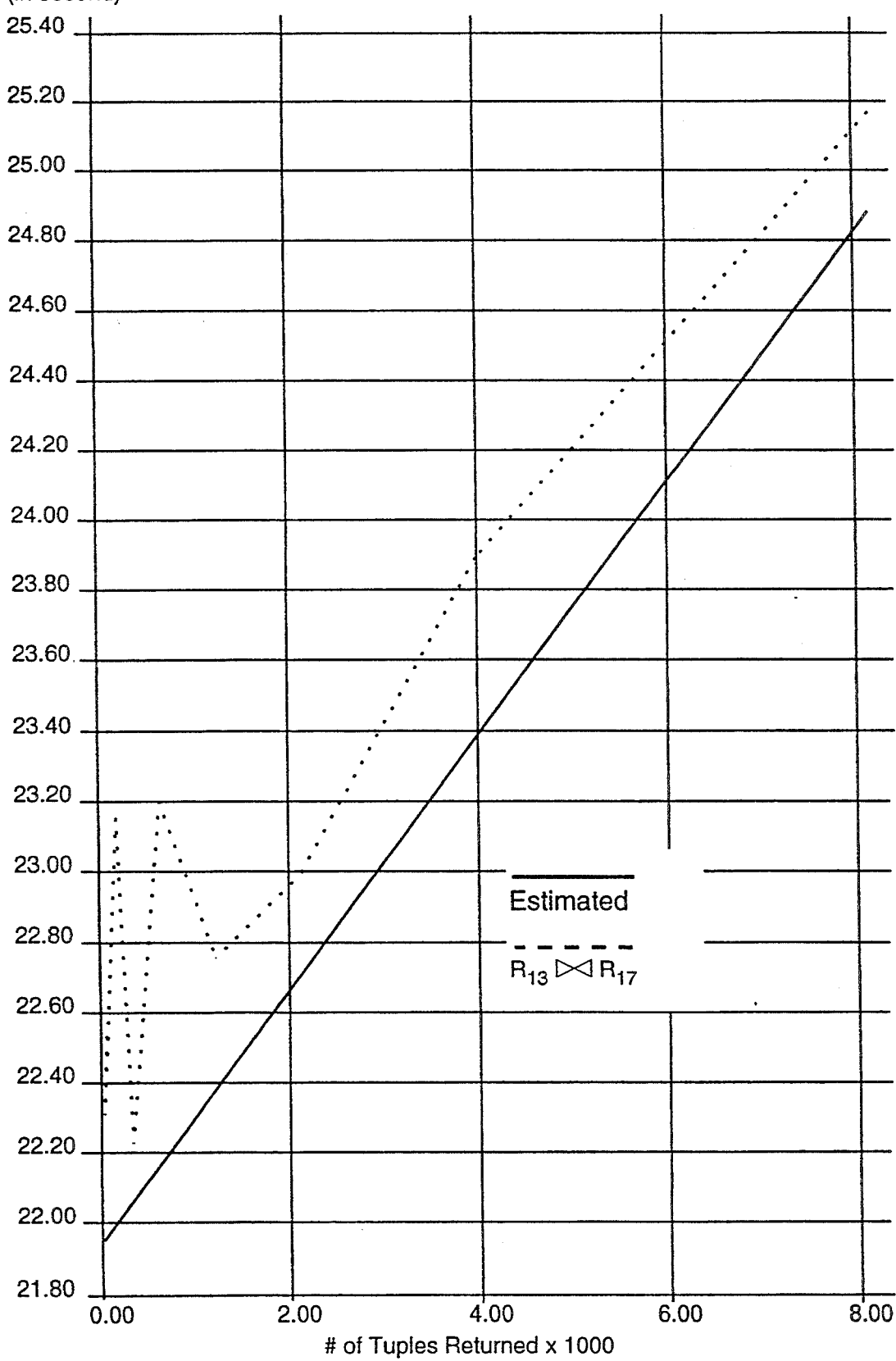

CALIBRATION OF LOGICAL COST FORMULAE FOR QUERIES IN A HETEROGENEOUS DBMS USING SYNTHETIC DATABASE

A portion of the disclosure of this patent document contains material which is the subject of copyright protection. The copyright owner has no objection to facsimile reproduction by anyone of the patent document or the patent disclosure, as it appears in the U.S. Patent and Trademark Office file or records, but otherwise reserves all copyrights whatsoever.

BACKGROUND OF THE INVENTION

This invention relates to multi-computer systems, and more particularly to database management systems within interconnected computer networks.

The term "distributed database management system" as applied here means a computer system for a database management system (hereinafter, "DBMS") involving multiple computer sites, each with a local database connected together in a communications network, in which a user at any site can access data stored at any other site.

Each site, in turn, has a DBMS in its own right: It has its own terminals and users, its own local storage and CPU (central processing unit), running its own database and database administration functions (i.e., a local DBMS). It also has its own data communications manager with the additional responsibility for controlling the exchange of messages with other sites in the overall distributed database system. Taken together, a distributed database management system wherein individual database systems may be from different manufacturers, the overall system is often referred to in the literature as a heterogeneous distributed database management system, or HDBMS. An HDBMS must support various database systems with different database models, languages, and services.

An example of such a system is shown in FIG. 1. The example represents a simple distributed banking system with two sites, for example, one in Portland, Oreg. and one in Washington, D.C. Of course, real distributed systems usually involve more than just two sites. But suppose account records for the Washington, D.C. area are stored in a local database at the D.C. site, while account records for the Oregon area are stored in a local database at the Portland site. Suppose further that the two sites are linked together to form a single "global" or distributed database. The system combines efficiency of processing (the data is stored close to the point where it is most frequently used) with increased accessibility (it is possible to access a Washington, D.C. account from Portland, Oreg., and vice versa, via a communications link).

A Review of the Objectives of a Distributed Database System

A major objective of distributed database systems is to provide what is typically called location transparency, meaning that users should not need to know at which site any given piece of data is stored, but should be able to behave as if the entire database were stored at their local site. A request for some remote piece of data should cause the system to find that data automatically by consulting the system catalog. The system catalog is a data dictionary and may be regarded as a database in its own right (a system database, rather than an end-user database). The contents of the catalog can be regarded as "data about data"—that is, descriptions of other objects in the system, rather than "raw data." In particular, all the various schemas and mappings are stored. The catalog includes base tables, views, indexes, users, application plans, access privileges, etc. For instance, and of specific importance here, optimizers use catalog information to choose specific access strategies.

In a distributed database system, the system catalog not only includes the usual catalog data reviewed above, but also all necessary control information to enable the system to provide the desired location, fragmentation, and replication transparency mentioned in this section. The advantages of such transparency are that it simplifies the logic of application programs, and it allows data to be moved from one site to another as usage patterns change, without necessitating any reprogramming. In fact, location transparency is nothing more than another aspect of physical data independence (e.g., immunity of applications to change in storage structure and access strategy), as that concept applies here in the distributed model.

A second objective of distributed database systems is to support data fragmentation. A system supports data fragmentation if a given logical object, say the complete accounts file, can be divided into pieces (fragments) for physical storage purposes. In fact, we are tacitly assuming such support in our banking example, since we are storing Washington account records in D.C., and Oregon account records in Portland. The fragments in that example consist of, respectively, a "restriction" of the total accounts file (relation) to just those records having the location field set to either "Portland, Oreg.," or "Washington, D.C." Alternatively, we could decide to store checking account records in D.C., while storing savings account records in Portland; the fragments would again be "restrictions." In general, a fragment could be any arbitrary subrelation that can be derived from the original relation by means of "restriction operations."

A system that supports data fragmentation should also support fragmentation transparency;, that is, users should be able to behave in all cases as if the relation were not fragmented at all (data independence). In other words, users should be presented with a view of the data in which the fragments are combined together by means of suitable join and union operations.

Another objective for distributed database systems is to support data replication, and its corollary, replication transparency. The basic idea here is that a given logical object, say a given account record, may be represented at the physical level by many distinct copies (replicas) of the same stored object, at many distinct sites. For example, a given account record could be stored in both the D.C. and Portland databases. One advantage of such an arrangement is that retrievals can be directed to the nearest replica. The corresponding disadvantage is that updates must be directed to all replicas. Replication transparency means that users should not need to be aware of replication, but should be able to behave as if every logical object were represented by a single stored object.

Location, fragmentation, and replication transparency together imply that a distributed system should look and feel like a centralized system to the user. However, achieving this objective is not without problems, in particular, the problem of query access optimization.

The Basic Problem

The basic issue is that a distributed database system is a collection of sites, or nodes in a network, and networks, at least long haul networks, are slow. Long haul networks, which bind geographically dispersed sites, use telephone lines, in which the data rate is typically 50K–100K bits per second or less. Thus, an overriding objective in distributed database systems is to minimize the number and volume of messages. This objective in turn gives rise to problems in subsidiary areas, and in particular here, query processing.

The problem of query processing, particularly in the HDBMS environment, focuses on optimization which, accordingly, is the single most important consideration in distributed systems design. Optimization is the process that, for a given query, determines the optimum "execution" or "application" plan. An optimizer is a major subcomponent of the system responsible for producing an application plan (i.e., the machine code instructions to implement SQL statements). In the distributed system, an application plan must take into consideration multiple database systems, in a networked setting, with attendant overheads such as network communications speed mentioned above. Therefore, optimization is crucial to effective query processing, particularly in the HDBMS environment. To better understand the role of optimization and the problem solved by the invention, a brief review of the classical DBMS structure is in order.

A Review of the Classical DBMS Structure

From the user's viewpoint, there are typically four components to a state-of-the-art relational DBMS, namely, the Precompiler, Bind, Runtime Supervisor, and a Stored Data Manager. A pre-compiler is a preprocessor for application programs that contain embedded SOL statements. It collects those statements into a database request module (DBRM), replacing them in the original program by host language CALLs to a Runtime Supervisor. A Bind component compiles one or more related DBRMs, to produce an application plan (i.e., machine code instructions to implement the SOL statements in those DBRMs, including machine code calls to a Stored Data Manager.) A Runtime Supervisor oversees SOL application programs during execution. When such a program requests some database operation, control goes first to the Runtime Supervisor according to the CALLs inserted by the pre-compiler. The Runtime Supervisor then routes control to the application plan, and the application plan in turn, invokes a Stored Data Manager to perform the required function. A Stored Data Manager manages the actual database, storing and retrieving records as requested by application plans. It invokes other low-level components as necessary to perform detail-level functions such as buffering data, locking, sorting, and the like during the performance of its basic tasks.

From an internal operational viewpoint, the same four components are at play namely: before the application source code can be compiled by its regular language compiler, it must be pre-processed by a Precompiler to strip out the SQL function statements and replace said SQL with call lines to the Runtime Supervisor; then the stripped SQL, which is gathered into a DBRM, is compiled into an application plan, which is then used by the Runtime Supervisor every time it encounters a CALL from the executing application. However, a closer look at the Bind step is necessary to understand the optimization issue.

As already suggested, Bind is really a database compiler: it converts high level database requests, in effect SQL statements, into machine code. However, Bind is actually an optimizing compiler: the output from Bind is not just machine code, it is optimized code. The input to Bind is one or more DBRMs. The output from Bind (i.e., the compiled code, which is an "application plan") is stored away in the system catalog, where it can be found when needed by the Runtime Supervisor.

A major subcomponent of Bind is an Optimizer. Its function is to choose, for each SQL statement processed, an efficient access strategy for implementing that statement. Recall that data manipulation statements in SQL such as SELECT specify only what data the user wants, not how to get to that data. The access path for getting to that data will be chosen by the optimizer. Programs are thus independent of such access paths, which is desirable for reasons of data independence. As an example, consider the following simple SELECT SQL statement:

| EXEC | SQL | SELECT | DOCKET |
|------|-----|--------|--------|
|      |     | INTO   | :XDCKT |
|      |     | FROM   | ALEX   |
|      |     | WHERE  | ALEX# = '17AUG92' |

Even in this very simple case, there are at least two ways of performing the desired retrieval: 1) by doing a physical sequential scan of table ALEX until the record for Aug. 17, 1992 is found; or 2) if there is an index on the ALEX# column of that table then by using that index and thus going directly to the Aug. 17, 1992 record.

The optimizer will choose which of these strategies to adopt. More generally, given any particular SQL statement to be optimized, the optimizer will make its choice of strategy on the basis of considerations such as:
— which tables are referenced in the request;
— how large those tables are;
— what indexes exist;
— how selective those indexes are;
— how the data is physically clustered on the disk(s);
— the form of the WHERE clause in the request; and so on. The optimizer will then generate machine code dependent on the choice of strategy. If, for example, the optimizer decides to make use of some existing index, say X, then them will be machine code instructions in the application that refer explicitly to X. The resulting strategy is often the referred to as cost modeling.

The point is that there will be many possible strategies for processing a given query (in general). For example, a request for a join of a relation R(a) stored at site PDX and a relation R(b) stored at site DC could be carried out by moving R(a) to DC or by moving R(b) to PDX, or by moving both R(a) and R(b) to a third site, LA (etc.). In other words, there might be six plausible query processing strategies (relying on a certain set of assumptions) where the response time could run anywhere from several seconds to several days. Accordingly, each processing strategy will have an associated cost. The goal of optimization then is the selection of a least cost strategy.

Query processing optimization remains one of the stumbling blocks to effective distributed heterogeneous database management systems (HDBMSs). More often than not, a distributed database system will be heterogeneous rather than homogenous in nature. In other words, each site within the distributed system may have its own particular flavor of database management system. Importantly, access to internal system management data regarding query access optimization at the local level may be severely restricted or unavailable altogether. Yet, an end-user application requesting data from this distributed environment must be able to optimize its data access strategies lest database query operations over the network be unacceptably slow.

In a heterogeneous DBMS, the execution space must be extended to handle global queries across all of its constituent DBMSs. This can be done simply by means of new join methods that extend across these DBMSs. Therefore, execution space and search strategies of the kind used with existing commercial DBMSs can be used in a heterogeneous DBMS only if a cost model were made available for all categories of DBMSs in the heterogeneous DBMS. Such cost models have not been provided by existing systems. The crux of the problem, then, is to derive a cost model for each of the DBMSs. This involves calibrating a given relational DBMS and deducing the cost coefficients of the cost formulae.

In reality, distributed database systems end up requiring tremendous cooperation and compromise among satellite sites in selecting and using a common database management system which will accommodate such an operational setting. Thus, heterogeneous, or "open" distributed database systems, although very desirable, are typically impractical. It can be seen, therefore, that in certain large corporate computing settings, great cost is involved in systems integration, and in many cases, retooling altogether.

Accordingly, there remains a need for a heterogenous query optimization method that extends the traditional optimizer strategy widely used in a commercial DBMS to allow execution of queries over both a known DBMS and foreign DBMS in a heterogeneous distributed database management system.

SUMMARY OF THE INVENTION

One object of the invention is to successfully optimize and execute queries in a heterogenous database management system (HDBMS) in which there are a variety of database managers.

Another object of the invention as aforementioned is to optimize database queries in different databases with minimal knowledge of physical performance or operational models for each of the database managers.

The invention is a heterogenous database management system that employs a query optimization method capable of optimizing database queries to different databases in a seamless fashion over both known and/or foreign vendor DBMSs that conform to some standard such as providing the usual relational database statistics. The optimizer can optimize database queries in different databases with no knowledge of performance or operational models for each of the database managers being required in order to calculate optimal query access strategies across all databases within the distributed network.

The invention employs a calibrating database that is synthetically created so as to make the process of deducing the cost model coefficients substantially devoid of unpredictability problems. The particular cost model that is employed in the invention makes its estimates by using logical characteristics of query performance rather than physical aspects of the query means. More particularly, the cost of a query is estimated based on logical characteristics of the DMBS, the relations, and the query itself; the cost of complex queries is estimated by using primitive queries.

The calibrating database is utilized in a series of benchmarkings to calibrate the coefficients in the cost formulae for any given relational DBMS without requirement for local database query access cost model data which may be severely restricted or unavailable altogether. The resulting calibrating cost models are stored in a HDBMS system catalog for subsequent access strategy development and management.

The synthetic calibrating database is configured such that, given a test query, the resulting execution is predictable; that is, the optimizer will choose the predicted access and join methods. The system cannot be instrumented to measure the constants (e.g., number of I/O issued) of a traditional cost model. Further, the construction of the database, posing of the queries, and making the observations are performed as a user to a 'black-box' DBMS; that is, the calibration effort need know nothing of the performance characteristics or cost models for a given participating DBMS. Therefore, in order to deduce coefficients in the cost formulae, it is imperative that the queries and the database are configured such that the resulting execution is predictable; i.e., the optimizer will choose the predicted access and join methods. Even if the execution is predictable, it must be free from the above-mentioned distortion or else the determination of the cause for the observed effect is not possible. For example, if all the tuples having a particular value for an attribute just happened to be in single page then the observed value could be misleading.

Accordingly, a further object of the invention as aforementioned is to create a database and a set of quedes that are free of these distortions so that subsequently the coefficients of the cost formulae can be accurately deduced. To meet this further object, in another aspect of the invention, the data access logical cost model which results from the calibration process employing the synthetic database, relies on logical information of databases such that the cost coefficients are viewed as functions, and the values associated to these coefficients are a composite cost of CPU utility and input/output overhead.

The foregoing and other objects, features and advantages of the invention will become more readily apparent from the following detailed description incorporating a Case Study which implements the invention, which proceeds with reference to the accompanying drawings.

BRIEF DESCRIPTION OF THE DRAWINGS

FIG. 3 - unused.

FIG. 4 is a table which lists the actual queries used for calibration.

FIG. 5 is an elaboration of FIG. 3. The process of actually deriving the cost model coefficients involves an additional optimizing step and then storing the cost model data into a system wide catalog for future use by application plans.

FIG. 6 is a description of the cost and join formulae used in the Case Study which is an implementation of the invention in a test environment.

FIG. 7 is a table of values for the six principal attributes of fourth relation ($R_4$) in the calibrating model employed in the Case Study which implements the invention.

FIG. 8 is the definition for the $i^{th}$ tuple in $R_n$ and the values of the corresponding attributes utilized in the calibration model employed in the Case Study which implements the invention.

FIG. 9 is a table of the calibrating relations used in the calibrating model employed in the Case Study which implements the invention.

FIG. 10 is a table of the SOL test queries used in the actual calibration process in the Case Study which implements the invention.

FIG. 11 is a table of the cost formulae coefficient values used for the Allbase, DB2 and informix RDBMS systems used in the Case Study which implements the invention.

FIGS. 12A and 12B are a complete list of all SOL test join queries used in the Case Study which implements the invention.

FIG. 14 is a graph analysis of the comparison of estimated value to observed values for the type 3.1 join queries used in the Case Study.

FIG. 15 and FIG. 16 are two graph analyses illustrating the comparison of predicted and observed costs of the test queries against the DB2 RDBMS utilized in the Case Study which implements the invention.

DETAILED DESCRIPTION OF THE PREFERRED EMBODIMENT

Figure 1:
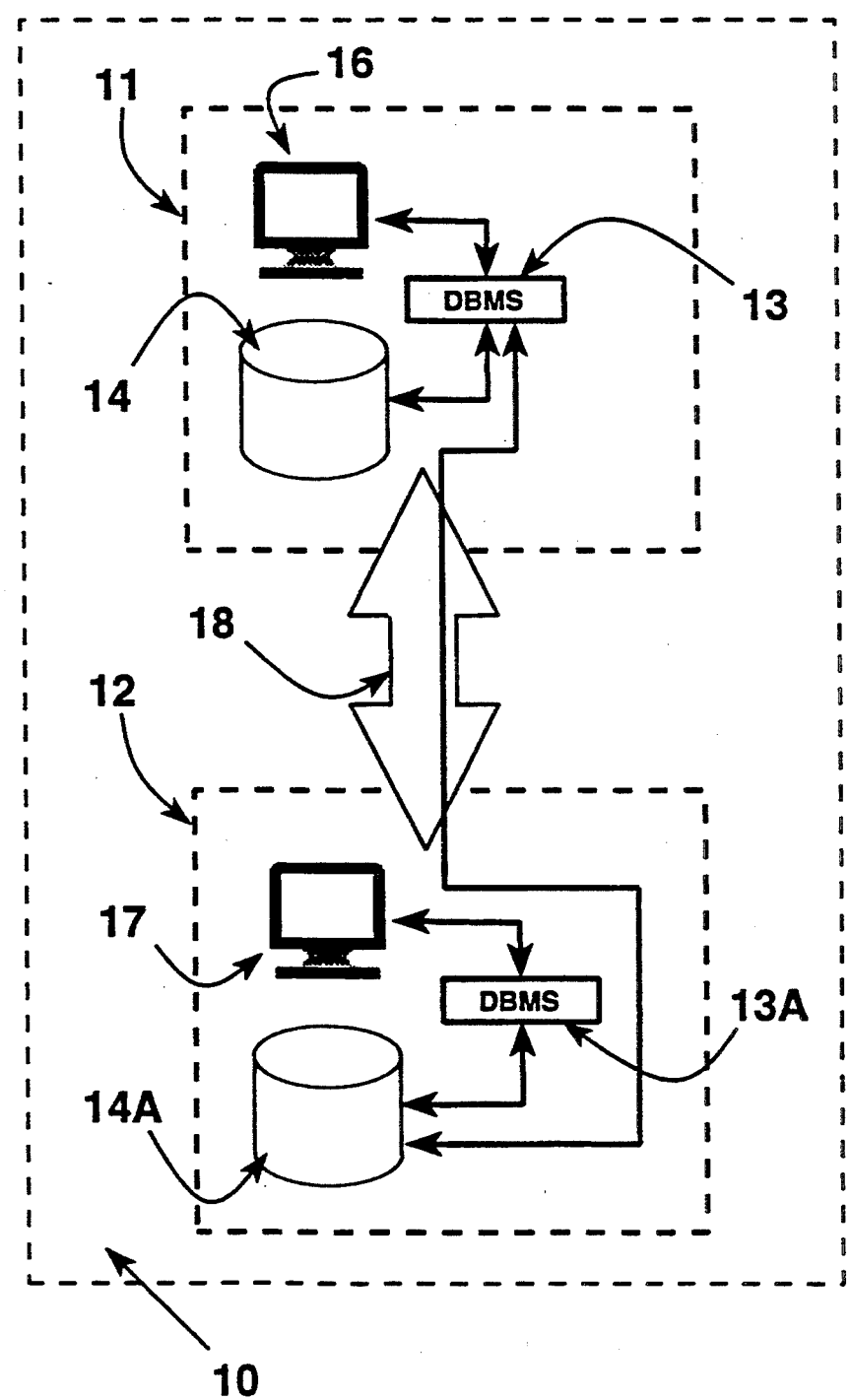
FIG. 1 illustrates a simple multidatabase machine network of two or more machines interconnected by bidirectional digital data communications channels.

Referring to FIG. 1, a distributed computer database network 10 has a requestor database machine system 11 and one or more database machine systems 12. The configuration represents, for example, a simple distributed banking system with two sites, one in Portland, Oreg. and one in Washington, D.C. In the invention either a local area or long haul network will work; for purposes of this discussion, we consider the distributed network over a long haul communication means with machines in separate cities.

Query accesses in this network distributed database system involve a requestor machine system 11 having its database manager 13 search databases 14, 14A on itself and one or more other machine systems 12, and return a search result to a requestor workstation 16. High speed communications facilities between machines can be implemented through a variety of means 18 from standard 10 megabit per second ethernet local area networking to long-haul data communications facilities which transfer data over great distances at rates of 50 to 100 kilobits per second. The system 10 is considered heterogeneous if the individual local databases are managed by separate and distinct sub-systems called database managers 13, 13A, etc. whose only unifying means is a standard structured query language. The intended result is that the information database, although distributed across multiple machine systems, perhaps geographically dispersed, appears to be one seamless large system. The machine interconnects and separate components, therefore, are transparent.

The present invention allows this heterogeneous distributed database system 10 to accept unlimited number database queries from an unlimited number of participating workstations 16, 17, directed at the overall database as distributed by the architecture. Moreover, the present invention provides the ability to store, maintain, and modify data in a multi-machine, multi-database network independent of the make or particular nuances of the individual database management sub-systems 13, 13A, etc. The system as detailed below is a significant improvement over the prior art because for the first time, database managers from a variety of makers can be combined to form one seamless large database management network with acceptable, if not excellent, performance in terms of the cost of query accesses across these differing database management systems.

System Overview

Figure 2A:
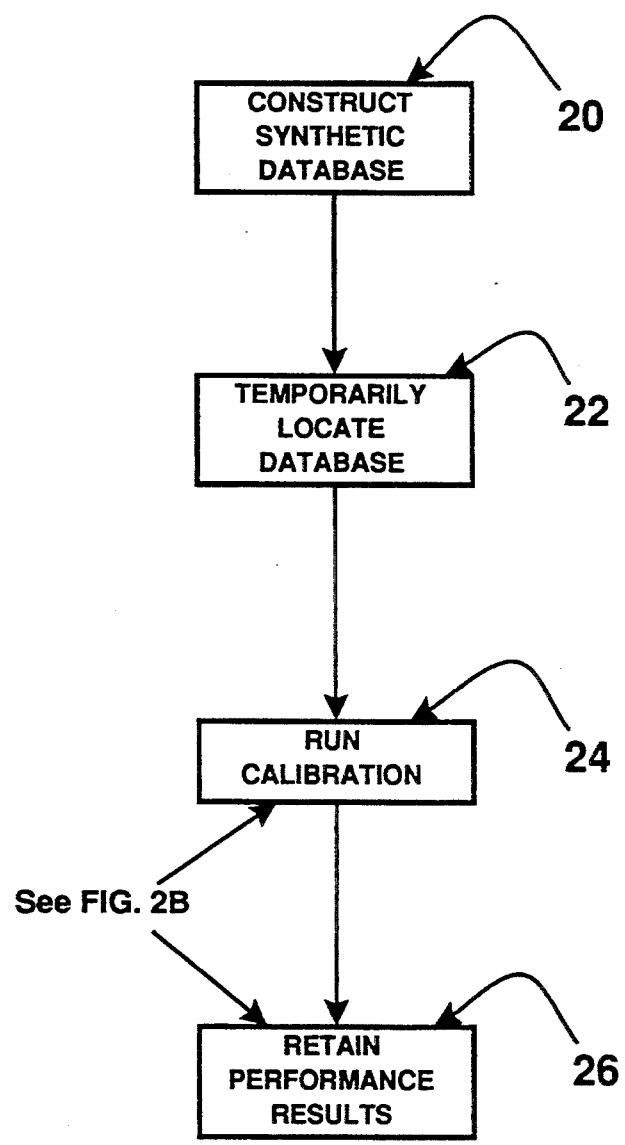
FIG. 2A illustrates the process of constructing a synthetic database and applying it against each of the participating database managers (DBMS) on each database machine in the heterogeneous distributed database network.

Referring to FIG. 2A, the process of calibration requires first constructing a synthetic database 20 which is used to calibrate query methods for all database managers 13, 13A, etc. within the system 5 of FIG. 1. The synthetic database can be constructed on any machine and is applied once to derive cost models associated with accessing data through each of the database managers. The database 20, also referred to as a calibrating database, can be stored for future use should a new DBMS be added to the network. The database 20 is located 22 on each machine system 11, 12 of FIG. 1 and a calibration is run 24 against the database by each local database manager 13, 13A, etc. of FIG. 1 using standard structured query language queries. The performance results of the calibration are retained 26 for future use by application programs requiring data access on any of the participating database machines.

The Synthetic Database

Figure 2B:
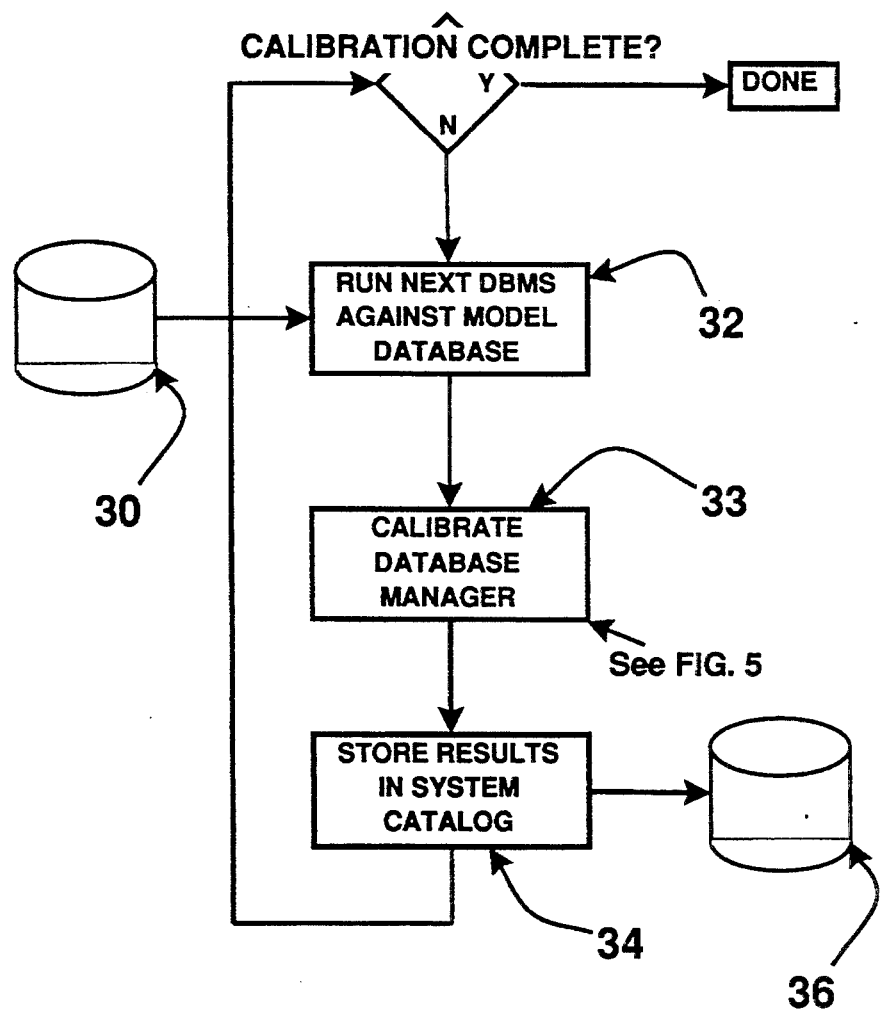
FIG. 2B illustrates the process of actually calibrating participating DBMSs in the network as an elaboration of FIG. 2A.

Referring to FIG. 2B, a synthetic database 30 is constructed to calibrate the coefficients in the cost formulae for the relational DBMSs 13, 13A, etc. of FIG. 1. As described above, this synthetic database is constructed and queried by each of the participating DBMSs. This process is iterative in nature, sequentially applying a series of queries through each DBMS against the synthetically created database which temporarily replaces the usual database for calibration purposes. Cost metric values (e.g., elapsed time) for the queries are observed to deduce coefficients.

The synthetic database is created by allowing for an integer "n," $R_n$ to be a relation of seven columns containing $2^n$ tuples. The seven columns have the following attributes:

$C_1$: integer [0, n], indexed and clustered;

$C_2$: integer [0, $2^n-1$], indexed, defacto clustered, but not specified to the DBMS as such;

$C_3$: integer [0, n], indexed, unclustered;

$C_4$: integer [0, n], no index;

$C_5$: integer [0, $2^n-1$], indexed, unclustered;

$C_6$: integer [0, $2^n-1$], no index; and $C_7$: a long character string to meet the size of the tuple requirement.

The value for the seventh attribute is a padding field and can be set to anything and therefore, for convenience, omitted from the rest of the description.

The multicolumn key for the relation is ($C_1$, $C_2$). This relation is indexed on this key, in ascending order, with $C_1$ being the major key and $C_2$ being the minor key. This index is clustered in the sense that the values of the major key are clustered. The values of the minor key (i.e., $C_2$) are also clustered. In fact, the values in $C_2$ are unique and have $2^n$ values in the range [0, $2^n-1$] and therefore these values can also be in ascending order. Therefore, the column, $C_2$, can be viewed as a sequence number for the rows. This $C_2$ value is referred to as the row index. The need for the multicolumn key and index is so that the tuples are ordered in the disk pages based on $C_2$ and the system is informed that $C_1$ has a clustered index (see the Case Study infra).

Application of the Synthetic Database

Referring again to FIG. 2B, (having spawned a database according to the description above), the synthetic database 30 is subsequently deployed 32 under each of the participating DBMSs 13, 13A, etc. of FIG.1 as a temporary replacement for the regular databases 14, 14A of FIG. 1.

A test suite of queries 33 are run against the synthetic database under each DBMS 13, 13A, etc. of FIG. 1. Resulting performance data (e.g., elapsed time) 34 are stored into a system wide catalog 36. Within the preferred embodiment, the calibration is set up to use mostly single table queries. This is not only because the join queries are time-consuming and therefore take too long to calibrate the system, but also because the cost of most join queries can be estimated using those of single table queries.

There are sixteen relations used in these calibrations (see the Case Study infra). Each type of relation is instantiated with two sizes of tuples and the smaller tuple relation is duplicated. This duplication is required because the join queries need two identical relations. The actual queries used in the calibration are given in FIG. 4, where $R_n$ is a table of cardinality $2_n$ and c is a constant which determines the selectivity. For each type of query against $R_n$, a set of queries with selectivity $2^{-i}$ (where i=1,2, . . .,n) are constructed and observed.

Referring to FIG. 5, for each query 40 the elapsed time in the DBMS is recorded 42. The elapsed time is calculated by subtracting the start timestamp (when the query is received) from the end timestamp (when the result has been sent out). In all DBMSs the queries are posed after flushing all the buffers to eliminate the distortion due to buffering. Each query is issued thirty times and the average elapse time is calculated. Relative error between actual data and average value is within 5% with a confidence coefficient of 95%. Thus, the repeatability of the observation is assured. From this data in 42, the coefficients for the cost formulae can be deduced. A Least Squares fitting algorithm is employed 44 to minimize any errors and estimate the coefficients.

The resulting cost data 34 of FIG. 2B is then added to the system catalog 36 as a part of a cost model. The cost model includes data access cost information about communication time between the database machines via the communications network as well as cost data concerning operations of the central processing units and input/output structures of the database machines. The cost model is structured in accordance with the logical execution of the database queries and estimating the cost of a given query based on logical characteristics of the DBMS to which a query is directed, relations between data stored in the relational database being queried, and the structure of the query. The cost of a complex query is estimated using a set of primitive queries. All subsequent multi-database queries can now rely on the network system wide catalog cost information derived from the calibration process to ensure optimized queries and acceptable, if not excellent, performance.

Execution of multi-database queries is carried out by defining a space of executions for a database query including, for example, a remote join across the involved database management systems. As a query access strategy is constructed which involves a relation including a tuple of variable size, and a number of selection and projection clauses. A logical cost model as next described is used to estimate the cost of the strategy as a linear function of the size of the tuple and as linear functions of the selection and projection clauses.

The Logical Cost Model

Within the HDBMS environment, DBMSs typically are referred to as conforming when they are relational in design and structure, have more or less standard query functionality, that is, employ a standard structured query language (SOL); and employ traditional cost model metrics such as access statistics. The usefulness of the synthetic database and the corresponding calibration process is weighted by the existence of a cost model which applies to the entire network of conforming distributed database management systems, rather than any one specific DBMS. The system subject of this invention employs a novel logical cost model such that the estimation of a given query relies on logical characteristics of the query performance rather than physical aspects of the query means.

The logical cost model views the cost on the basis of the logical execution of the query. There are two implications. First, the cost of a given query is estimated based on logical characteristics of the DBMS, the relations, and the query itself. Second, the cost of complex queries (e.g., nested loop joins) is estimated using primitive quedes (e.g., single table queries) as described above in the synthetic database structure.

This cost model focuses on estimating the cost of select and join operations (refer to the Case Study infra). Formally, given two relations $r_1$ and $r_2$ with $N_1$ and $N_2$ tuples, the cost of the following two operations are estimated:

—a select operation on $r_1$ with selectivity S; and
—a join operation on $r_1$ and $r_2$ with selectivity J.

These operations rely on the following assumptions:
—The size of the tuple is assumed to be fixed.
—There is exactly one selection/join condition on an operation.
—The entire tuple is projected in the answer.
—All attributes are integers.

Therefore, the resulting cost formula can be viewed as a sum of the following three independent components:

Component$_0$:initialization cost
Component$_1$:cost to find qualifying tuples
Component$_2$:cost to process selected tuples Component$_0$ is the cost of processing the query and setting up the scan. This is the component that is dependent on the DBMS, but independent of either the relation or the query. In the case of sequential scan, Component, consists of locking overhead, doing the "get-next"

operation, amortized input/output (I/O) cost, and all the other overhead incurred per tuple of the scan. The fixed size of the tuple assures that the number of pages accessed is directly proportional to the number of tuples. Therefore, the cost per tuple is a constant.

In the case of index scans, $Component_1$ is the initial index look-up cost. In all cases of index scans, $Component_1$ is assumed to be independent of the relation. This is not true as the number of levels in the index tree is dependent on the size of the relation. But this number is not likely to differ significantly due to the high fan-out of a typical B-tree or any other indexing mechanism.

$Component_2$ is the cost of processing each of the selected tuples. This component cost is also likely to be a constant because of the selection and projection assumption made above.

The join formulae are derivations from the nested loop and ordered merge processes. They am composed of selection cost formulae with certain adjustments to handle operations (e.g., sorting and merging) and problems (e.g., buffering effect) particular to join operations. For example, the cost of accessing a relation in the innermost loop is modeled in the same manner as that of accessing a relation in the outermost loop. This is not the case if the innermost relations are buffered to avoid the I/O. If a sequential scan is used in the innermost loop of the join, the I/O cost may only incur once (for small tables) due to buffering whereas the table look-up is done once for each tuple in the outermost loop. In order to handle this, Component, is broken into two parts in the formulae for sequential scans. These two parts represent the I/O and the CPU costs of the "get-next" operation.

In order for the logical cost model to be effective, however, we must take into account that, as the size of the tuples vades, the constants will be affected. In particular, the CPU cost of processing each tuple of the relation together with the amortized I/O cost of fetching each tuple of the relation will be affected and is likely to increase linearly with the size of the tuple, regardless of whether the tuple is selected or not. All other constants described above are component costs for selected tuples, and therefore, not likely to be affected. However, these constants are affected by the number of selection and projection clauses. The novelty of this aspect of the invention is the redefinition of typical DBMS cost model constants as functions with the following considerations:

— the cost of the initial index lookup is a linear function on the size of the tuple in the relation; and
— the costs of processing a result tuple for sequential scans and processing each tuple selected by an index including I/O cost to fetch a tuple if necessary are linear functions on the number of selection and projection clauses.

As these values are no longer constant, they are referred to as coefficients. The respective coefficients capture the processing, indexing, and paging characteristics of each data type (see the Case Study infra at page 21).

The fundamental basis for this logical cost model is that the cost can be computed based on factoring the costs on a per tuple basis in the logical processing of the query. The coefficients are all composite costs including CPU and I/O, and any other factors that could be of interest such as the cost of a connection. In this sense, the cost formulae are logical versus the cost formulae employed in typical commercial DBMSs which estimate costs based on physical parameters using constants. Yet, the above formulae are nevertheless similar to typical commercial ones with three significant differences:

— The traditional formulae assume that the coefficients are constants. Here they are viewed as functions.
— The value associated with these coefficients is a composite cost of CPU and I/O, whereas these costs are separately computed in most commercial DBMSs.
— The value associated with the coefficients can also reflect other system dependent factors such as hardware speed and operating system and DBMS configuration factors.

It should be apparent to those skilled in the art that the invention described in its preferred embodiment can be readily extended to include a plurality of considerations which can refine the calibration process. These considerations include, but are not limited to, — quantifying the effect of buffering on unclustered indexes;
— extrapolating for non-standard DBMSs;
— inferring de facto clustering from the data to interpolate the cost of less clustered data; and
— detecting when an index scan switches to a sequential scan for an unclustered index within the context of access methods used in nested loops.

A CASE STUDY EMBODYING THE INVENTION

This is a Case Study used as a test bed for proving the viability of the invention. In this Case Study, we assume that participating DBMSs in an HDBMS are all relational and for the sake of simplicity assume that all data are schematically and representationally compatible; i.e., there is no integration problem. In this sense, the HDBMS provides a point for querying all the participating DBMSs and provides database transparency (i.e., the user need not know where data reside and how queries are decomposed). Therefore, the HDBMS is relegated the responsibility for decomposing and executing the query over the participating DBMSs. This is the motivating need for a query optimizer for HDBMSs. Without loss of generality, we assume that the query is a conjunctive relational query.

A Quick Review of the Traditional Optimizer

The optimization of relational queries can be described abstractly as follows:

Given a query Q, an execution space E, and a cost function C defined over E, find an execution e in $E_Q$ that is of minimum cost, where $E_Q$ is the subset of E that computes Q expressed as $\min_{0 \in E_q} C(e)$ Any solution to the above problem can be characterized by choosing:

1. an execution model and, therefore, an execution space;
2. a cost model; and
3. a search strategy.

The execution model encodes the decisions regarding the ordering of the joins, join methods, access methods, materialization strategy, etc. The cost model computes the execution cost. The search strategy is used to enumerate the search space, while the minimum cost execution is being discovered. These three choices am not independent; the choice of one can affect the others. For example, if a linear cost model is used, then the search strategy can enumerate a quadratic space; on the other hand, an exponential space is enumerated if a general cost model is used, as in the case of commercial database management systems. This Case Study does not depend on either the execution space (except for the inflection mentioned below) or the search strategy employed. However, it does depend on how the cost model is used in the optimization algorithm. Therefore, the following assumptions are made.

The execution space can be abstractly modeled as the set of all join orderings (i.e., all permutations of relations) in which each relation is annotated with access/join methods and other such inflections to the execution. These and other inflections to the traditional execution space are formalized below.

The exhaustive search is assumed as the search strategy over the execution space, which has been widely used in many commercial optimizers. This space of executions is searched by enumerating the permutations and for each permutation choosing an optimal annotation of join methods and access methods based on the cost model. The minimum cost execution is that permutation with the least cost.

The traditional cost model uses the description of the relations, e.g., cardinality and selectivity, to compute the cost. Observe that the operands for these operations such as select and join may be intermediate relations, whose descriptions must be computed. Such a descriptor encodes all the information about the relation that is needed for the cost functions.

Let the set of all descriptors of relations be D, and let I be the set of cost values denoted by integers. Attention is paid to two functions for each operation, $\sigma$, such as join, select, project etc. These functions for a binary operation $\sigma$ are:

$COST\sigma: D \times D \to I$ and $DESC\sigma: D \times D \to D$.

The $COST\sigma$ function computes the cost of applying the binary operation sigma to two relations, and $DESC\sigma$ gives a descriptor for the resulting relation. The functions for the unary operators are similarly defined. This Case Study is mainly concerned with the COST function and assumes the traditional definitions for the DESC function. This has the information such as the cardinality of the relation, number of distinct values for each column, number of pages, index information, etc.

Execution Model for HDBMSs

An execution plan for a query can be viewed as a plan for a centralized system wherein some of the joins are across DBMSs. These joins can be viewed as alternate join methods. Herein, the formal definition of a plan for a traditional DBMS, which is extended by allowing the new join methods.

A plan for a query, in most commercial DBMSs, denotes the order of joins and the join method used for each join and the access plan for each argument of the join. Additionally, the usual information needed to denote the sideway information passing (also known as the binding information) is assumed.

Formally, a plan for a given conjunctive query is expressed using a normal form called Chomsky Normal Form or CNF. A CNF program is a Datalog program in which all rules have at most two predicates in the body of the rule. Consider a conjunctive query on k relations. This can be viewed as a rule in Datalog with k predicates in the body. An equivalent CNF program can be defined using k-1 rules each of which has exactly two predicates in the body. This is exemplified below.

$p(X,Y) \leftarrow r_1(X, X_3), r_2(X_1,X_2), r_3(X_2,X_3), r_4(X_3,Y)$ has the following equivalent CNF program:

$p(X,Y) \leftarrow r_{13}(X,X_3), r_4(X_3,Y)$
$r_{13}(X,X_3) \leftarrow r_{12}(X,X_2), r_3(X_2,X_3)$
$r_{12}(X,X_2) \leftarrow r_1(X,X_1), r_2(X_1,X_2)$ In the above CNF program the added restriction is given that the execution is left to right in the body of the rule. As a result, the sideway information passing through binding is from $r_{13}$ to $r_4$ in the first rule. Further note that the CNF program completely denotes the ordering of joins of the relations. Therefore, $r_1$ and $r_2$ are joined before the join with $r_3$. Note that the above CNF program can represent all type of bushy join trees; in contrast most commercial DBMSs allow only left deep join trees.

For simplicity, in this Case Study all CNF programs are assumed to be left-deep (i.e., only the first predicate in the body can be a derived predicate) and thus omit other CNF programs from consideration.

For each join in the CNF program, a join method is assigned; one join method is associated with the body of each rule. Two join methods are considered: nested loop (NL) and ordered merge (OM) such as sort merge or hash merge. Further, each predicate is annotated with an access method; i.e., at most[1] two access methods per rule. These are the four access methods considered in this Case Study:

[1] Note that in some cases such as the outer loop (of a nested loop join) that is being pipelined from another join, annotation of an access method does not make sense.

sequential scan (SS): access and test all tuples in the relation;
index-only scan (IO): access and test index only;
clustered index scan (CI): access and test clustered index to find qualifying tuples and access the data page to get the tuple; and
unclustered index scan (UI): same as CI, but for unclustered index.

This list of methods reflect the observations in many commercial DBMSs such as differentiating accessing index page only versus accessing both index and data pages. Access to clustered and unclustered index pages is not differentiated.

Even though all access methods can be used with all join methods, some combinations do not make sense. Nevertheless, the optimizer is assumed capable of avoiding these cases by assigning a very large cost. Note that the list of join methods and access methods can easily be extended and the cost formulae specified in a similar manner.

As mentioned before, the list of join methods is increased by a new method called remote join that is capable of executing a join across two DBMSs. This may be done by shipping the data directly to the other DBMS or to the HDBMS which in turn coordinates with the other DBMS to compute the join. Obviously, there is a host of variation in achieving this remote join. For simplicity sake in this Case Study, it is assumed that some such remote joins are chosen. For each such remote join, a cost function is associated and the cost of the complete execution is computed in the traditional manner. Even though the specific choices for the remote joins and the cost model used for estimating the cost of remote join are important for a HDBMS optimizer, such is omitted for purposes of this Case Study.

In summary, the optimizer searches a large space of executions and finds the minimum cost execution plan. As execution space and search strategy largely remain unchanged, only the cost model for each category of DBMSs is relevant in order to describe the optimizer for HDBMSs. In particular, this Case Study concentrates on the cost model for select and join operations in the context of a single DBMS, using which joins across DBMSs can be computed based on the remote join cost model. The cost models for proprietary and conforming DBMS are explained next.

Cost Model for Proprietary DBMSs

The cost model for a query over multiple proprietary DBMSs must be comparably capable to the cost model used in the DBMS itself. This requires that the cost model knows the internal details of the participating DBMS. For a proprietary DBMS, this is possible. For this Case Study, the cost model is outlined at a very high level. The intent is to observe the use of physical parameters such as prefetch, buffering, page size, number of instructions to lock a page and many other such implementation dependent characteristics.

Typically the cost model estimates the cost in terms of time; in particular the minimum elapsed time that can occur. This estimated time usually does not predict any device busy conditions, which in reality would increase the elapsed time. This notion of time is employed as the metric of cost. This is usually justified on the ground that minimizing this elapsed time has the effect of minimizing the total work and thereby 'maximizing' the throughput.

In HDBMSs, elapsed time can be estimated by estimating three components:
  CPU time incurred in both the participating DBMSs and the HDBMS
  I/O time incurred in both the participating DBMSs and the HDBMS
  Communications time between the HDBMS and the participating DBMSs.

Traditional centralized DBMSs included only CPU and I/O time in their estimate. This Case Study uses a similar estimate for both these components. For each of the join methods and access methods allowed, a cost formula is associated.

The CPU estimate includes the time needed to do the necessary locking, to access the tuples either sequentially or using an index, to fetch the tuples, to do the necessary comparisons, to do the necessary projections, etc. The cost formulae are based on estimating the expected path length of these operations and on the specific parameters of the relations such as number of tuples, etc. Obviously, these parameters are continually changing with the improvement in both the hardware and the software. For a proprietary system these changes can be synchronized with the new versions.

The I/O time is estimated using the device characteristics, page size, prefetch capabilities, and the CPU path length required to initiate and do the I/O.

The time taken to do the necessary communication can be estimated based on the amount of data sent, packet size, communication protocol, CPU path length needed to initiate and do the communication, etc. It is assumed that the physical characteristics of the communication subsystem are known to the HDBMS and accurate cost model can be developed using these parameters.

In summary, for this Case Study, the cost model for a proprietary DBMS is one that has complete knowledge of the internals of the participating DBMS.

Cost Model for Conforming DBMSs

A conforming DBMS is a relational DBMS with more or less standard query functionality. First, a cost model must be designed that will estimate the cost of a given query such that the model is based on the logical characteristics of the query. To do so, a cost model for estimating the cost of a given plan for a query must be outlined. Then the procedure by which to estimate the constants of the cost model as well as experimental verification of this procedure must be described. Finally, a dynamic modulation of these constants is presented to overcome any discrepancy.-

Logical Cost Model

The logical cost model views the cost on the basis of the logical execution of the query. There are two implications. First, the cost of a given query is estimated based on logical characteristics of the DBMS, the relations, and the query. Second, the cost of complex queries (e.g., nested loop joins) is estimated using primitive queries (e.g., single table queries).

Cost Formulae

For the sake of brevity, this Case Study focuses on that part of the cost model which estimates the cost of select and join operations. Formally, given two relations $r_1$ and $r_2$ with $N_1$ and $N_2$ tuples, we estimate the cost of the following two operations:
  a select operation on $r_1$ with selectivity $S_1$; and
  a join operation on $r_1$ with selectivity $J_{12}$ Referring now to FIG. 6, the formulae for these two operations are given with the following assumptions, all of which will be relaxed below:
  the size of tuple is assumed to be fixed
  there is exactly one selection/join condition on a relation;
  the entire tuple is projected in the answer; and
  all attributes are integers.

The select cost formulae can be viewed as a sum of the following three independent components:
  COMP0:initialization cost
  COMP1:cost to find qualifying tuples
  COMP2:cost to process selected tuples The COMP0 component is the cost of processing the query and setting up the scan. This is the component that is dependent on the DBMS, but independent of either the relation or the query.

In the case of sequential scan, the COMP1 component consists of locking overhead, doing the 'get-next' operation, amortized I/O cost and all the other overhead incurred per tuple of the scan. Note that the fixed size of the tuple assures that the number of pages accessed is directly proportional to the number of tuples. Therefore, the cost per tuple is a constant. In the case of index scans, COMP1 is the initial index look up cost. Note that in all the three cases of index scans, we assume that COMP1 is independent of the relation. This is obviously not true as the number of levels in the index tree is dependent on the size of the relation. But this number is not likely to differ by a lot due to high fanout of a typical B-tree or any other indexing mechanism.

The COMP2 component is the cost of processing each of the selected tuples. This component cost is also likely to be a constant because of the selection and projection assumption made earlier.

Referring now to FIG. 6, the join formulae are a derivation from the nested loop and ordered merge algorithms. Note that they are composed of selection cost formulae with certain adjustments to handle operations (e.g., sorting and merging) and problems (e.g., buffering effect) special to join operations.

For example, the cost of accessing a relation in the inner most loop is modeled in the same manner as that of accessing a relation in the outer most loop. This is not the case if the inner most relations are buffered to avoid the I/O. This uniformity is found to be quite acceptable for index scans. If a sequential scan is used in the inner loop of the join, the I/O cost may only incur once (for small tables) due to buffering whereas the table look up is done once for each tuple in the outer loop. In order to handle this, COMP 1 is broken into two parts in the formulae for sequential scans. These two parts represent the I/O and the CPU costs of 'get-next' operation.

Now relax the assumptions made above. As the size of the tuple is varied, the constants will be affected. In particular, only the constant $CS1_{ss}$ (=$CS1_{ss}^{io}$+$CS1_{ss}^{cpu}$) is expected to be affected and is likely to increase linearly with the size of the tuple. All the other constants are component costs for selected tuples and thus are not likely to be affected. But these constants (i.e., $CS2_{xx}$'s) are affected by the number of selection and projection clauses. In order to take these into account, we redefine the above constants to be functions with the following definitions:

$CS1_{ss}$ is a linear function on the size of the tuple in the relation.

$CS2_{xx}$'s are linear functions on the number of selection and projection clauses.

As these are no longer constants, we refer to them as coefficients.

Assuming that the checking is terminated by the first failure, the expected number of select condition checked is bounded by 1.5 independent of the number of selection conditions. This has been formally argued in the art and is well settled. Furthermore, the experiments show that the costs of checking selection conditions and projecting attributes are negligible comparing to other costs, e.g., I/O.

Next, relax the assumption that all attributes are integers by requiring one set of cost formulae for each data type in the DBMS. The respective coefficients will capture the processing, indexing, paging characteristics of that data type. As this is orthogonal to the rest of the discussion, the balance of the Case Study addresses just one data type.

The fundamental basis for the above cost model is that the cost can be computed based on factoring the costs on a per tuple basis in the logical processing of the query. Indeed, the coefficients $CS0_{xx}$, $CS1_{xx}$, and $CS2_{xx}$ are all composite costs including CPU, I/O, and any other factors that may be of interest such as the cost of connection. In this sense, the cost formulae are logical versus the cost formulae used in most commercial DBMSs which estimate based on physical parameters. The above formulae are structurally very similar to the ones that were used in the prior art. However, there are three major differences.

1. The traditional formulae of the prior art assumed that the coefficients are constants. Here they are viewed as functions.

2. The value associated with these coefficients are a composite cost of CPU, I/O and other considerations, whereas the prior art typically separates these costs in the calculation.

3. The value associated with the coefficients also reflects other system dependent factors such as hardware speed and operating system and DBMS configurations.

The above basis for computing the cost is obviously an approximation of the more involved formulae used by commercial DBMSs. But the important question is whether this approximations are significant to affect the optimizer decision. This Case Study shows that the above cost model will sufficiently model the behavior of the execution.

Calibrating Database and Procedure

The purpose of the calibrating database is to use it to calibrate the coefficients in the cost formulae for any given relational DBMS. The approach is to construct a synthetic database and query it. Cost metric values (e.g., elapsed time) for the queries are observed to deduce the coefficients. Note that there are no hooks assumed in the system and therefore the system cannot be instrumented to measure the constants (e.g., number of I/O issued) of the traditional cost model. Further, the construction of the database, posing of the query, and the observations are to be done as a user to this 'black-box' DBMS. This poses the following two major predicatability problems:

1. The problem of predicting how the system will execute (e.g., use index or sequential scan, use nested loop or sort merge) a given query.
2. The problem of eliminating the effect of data placement, pagination and other storage implementation factors that can potentially distort the observations and thus lead to unpredictable behavior.

In order to deduce the coefficients in the cost formulae, it is imperative that the query and the database are set up such that the resulting execution is predictable; i.e., the optimizer will choose the predicted access and join methods. Even if the execution is predictable, it should be free from the above mentioned distortion or else the determination of the cause for the observed effect is not possible. For example, if all the tuples having a particular value for an attribute just happened to be in a single page then the observed value can be misleading.

The next step then, is to set up a database and a set of queries that are free from the above two problems and show that the coefficients of the cost formulae can be deduced.

Calibrating Database

For any integer n, let Rn be a relation of seven columns containing $2n$ tuples. The seven attributes have the following characteristics:

$C_1$ integer $[0,n]$, indexed; clustered
$C_2$ integer $[0, 2^n-1]$, indexed, de facto clustered by not specified as such to DBMS
$C_3$ integer $[0,n]$, indexed, unclustered
$C_4$ integer $[0,n]$, no index
$C_5$ integer $[0, 2^n-1]$, indexed, unclustered
$C_6$ integer $[0, 2^n-1]$, no index
$C_7$ a long character string to meet the size of the tuple requirement The values in these attributes are given in FIG. 8. Even though the relation is a set and as such unordered, one can conceptually view it as a matrix. Thus, referring to FIG. 8, the $i^{th}$ tuple in $R_n$ is defined.

The value for the seventh attribute ($C_7$) is a padding field and can be set to anything and therefore, for convenience, omitted from the rest of the discussion. Referring to FIG. 7 the relation $R_4$ is tabulated.

The multicolumn key for the relation is ($C_1, C_2$). This relation is indexed on this key, in ascending order, with $C_1$ being the major key and $C_2$ being the minor key. This index is clustered in the sense that the values of the major key (i.e., $C_1$) are clustered. In general the values of $C_2$ may not be clustered. As it is clear from the construction of the relation, the values of the minor key (i.e., $C_2$) are also clustered. In fact, the values in $C_2$ are unique and have $2^n$ values in the range $[0, 2^{n-1}]$ and therefore these values can also be in ascending order. So, in some sense, one can view this column, $C_2$, as a sequence number for the rows. This $C_2$ value is referred to as the row index. The need for multicolumn key and index is so that the tuples are ordered in the disk pages based on $C_2$ and the system is informed that $C_1$ has a clustered index. This could be achieved by inserting the tuples in that order as long as the index creation in DBMS is stable, which most DBMSs do satisfy. In fact, this was used in calibration of systems in this Case Study. Note that the database can be generated by a procedure that evaluates the above formulae. Therefore, it is possible to generate a million tuple database in just minutes. In contrast the database generated using traditional prior art benchmarking technique requires significantly more time.

A Review of the Database Properties

Before describing the data, here are some definitions. Let SEQ(n,i) (similarly SIQ(n,i)) be a select query on $R_n$ using an equality (similarly inequality) predicate with the cardinality of the output result being $2^i$ for $i < n$. Such a query will be of use in the following discussion.

The values in $C_1$ are in ascending order with a clustered index. The f[i] gives the number of tuples in which the value i occurs in $C_1$. Let us define mf[i] to be the $i \wedge$ th most frequently occurring value in $C_1$. The distribution of values exhibits a 'normal' pattern such that the mf[i] value occurs in $\frac{1}{2} \wedge$ of the number of tuples. The formulae for $C_1[n,i]$ above has encoded this pattern, from which we can make the following lemma.

Lemma 1

For any relation $R_n$, and any selectivity $s_i = \frac{1}{2}^i, i \epsilon [1,n]$, there exists an equality predicate on $C_1$ whose selectivity is $s_i$.

Corrollary 1

There exists queries SEQ(n,i) and SEQ(n+1, i) on relations $R_n$ and $R_{n+1}$ respectively for i=1, 2, ...,n.
The above observations provide a guarantee that queries exist that
  select varying number of tuples using an equality predicate on the same relation; and
  select the same number of tuples using an equality predicate from multiple relations of different sizes.
For these queries using C1, the following claim can be argued with reasonable assurance.

Claim 1

Execution of any SEQ(*,*) query on C1 will result in the use of the clustered index scan.

As mentioned before, the predictability of the cost of executing a query SEQ(n,i) on C1 will depend on the CPU and I/O components. CPU cost increases monotonically with the size of the result. Because of the above claim, the I/O cost also increases monotonically until the maximum number of pages are accessed. Thus the number of I/O is a nondecreasing function of the size of the result. This class of function is referred to as a saturating monotonically increasing function.

Lemma 2

For any storage implementation, and page size used, the number of pages accessed by a SEQ(n,i) query using C1 will be given by a saturating monotonically increasing function on i.

Note that calibration of the cost formulae in the saturated region will result in incorrect calibration. However, observe that almost half the number of pages will not be accessed in the worst case. Therefore, if using large relations, the problem of saturation can be avoided. Thus, the unpredictability problems are avoided for any query on $C_1$.

Note that the values in $C_1$ are functionally determined by the value in $C_2$. In fact the values of $C_2$ are in ascending order because of the ascending-order indexing of the key. This observation and the fact that the index is clustered lead to the following lemma:

Lemma 3

Any storage implementation of this relation will retain this order of the tuples amongst pages of the relation. This observation provides a handle on the pagination of the data. This can be used to argue that $C_3$ and $C_4$ values are uniformly distributed across all pages.

The following two observations are stated here for completeness.

Lemma 4

For any relation $R_n$, and any selectivity $s_i = \frac{1}{2}^i$, $i \epsilon [1,n]$ there exists an inequality predicate on $C_2$ whose selectivity is $s_i$.

Corrollary 2

There exists queries SIQ(n,i) and SIQ(n+1,i) on relations $R_n$ and $R_{n+1}$ respectively for i=1,2, ...,n.

The values in $C_1$ am permuted into different rows of $C_3$. Therefore, the frequency distribution f[i] also applies to $C_3$ and $C_4$. This redistribution is done with the observation that half of the number of tuples have row index in binary representation the pattern *0 (i.e., last bit is zero), a quarter of the number of tuples have row index in binary representation the pattern *01, etc. Therefore, the distribution can be done as follows:
  All row indexes in binary that have the pattern *0 have value mf[1]
  All row indexes in binary that have the pattern *01 have value mf[2]
  All row indexes in binary that have the pattern *011 have value mf[3]
  ... and so on ...
Therefore, any value in [0,n] is uniformly distributed in the rows for $C_3$ and $C_4$. This leads to the following lemma.

Lemma 5

For any storage implementation, and page size used, and given a value i in [0,n], tuples containing value i for $C_3$ and $C_4$ are uniformly distributed amongst all the pages.

Using this lemma, the following observation is made that overcomes one predictability problem when using $C_3$ or $C_4$.

Lemma 6

For any storage implementation, and page size used, the number of pages accessed by a SEQ(n,i) query using $C_3$ or $C_4$ will be given by a saturating monotonically increasing function on i.

Again, saturating is not a problem because the unclustered index is mostly useful in the region when the selectivity is low. So if the calibration is restricted to this region then the I/O will be monotonically increasing. With CPU cost increasing monotonically, the predictability problem is avoided.

In order to determine the region when the index is being used, the following observations are made.

Claim 2

Execution of any SEQ(*,*) query on $C_3$ will result in the use of the index scan if the selectivity is low; but if the selectivity is high then the system may use sequential scan.

Claim 3

Execution of any SEQ(*,*) query on $C_4$ will result in the use of the sequential scan.

Knowing that $C_3$ and $C_4$ are identical, the region of selectivities when index is being used can be determined and used to calibrate the system. Thus, the unpredictability problems are avoided for queries on $C_3$ and $C_4$.

$C_5$ and $C_6$ are also permutations of $C_2$ and are intended for use with inequality queries. So the predicatability problem for such a query involves the number of pages accessed by a selection with an inequality predicate of the form $C_5 < i$. The values need to be distributed in such a fashion that the number of pages accessed are increasing as the selectivity is increased. This is achieved by distributing the values with the following property.

Lemma 7

For any $i \epsilon [0,n]$, the set of values $[0, 2^i - 1]$ are distributed uniformly in $C_5$ and $C_6$.

This results in requiring a SIQ(n,i) query to access a sequence of row indices such that successive row indices differ by a constant. Consider a query $C_5 < 8$. This will access the rows (0, 2, 4, 6, 8, 10, 12, and 14) in $R_4$ with the property that successive rows differ by 2. Note that the condition is of the form $C_5 < 2$. Using this observation we can state the following lemma.

Lemma 8

For any storage implementation, and page size used, the number of pages accessed by a SIQ(n,i) query using $C_5$ or $C_6$ will be given by a saturating monotonically increasing function on i.

Once again using the argument similar to the one used for $C_3$ and $C_4$ it can be argued that predicatability problems are avoided. The above observation for the relation Rn is particularly important because such a conclusion cannot be made if the relation is generated probabilistically as it was done in this Case Study.

In summary, the queries posed against any of the attributes in the relation have predictable behavior.

Calibrating Procedure

The next step is to deduce the coefficients from the observed execution of these queries.

Claim 4

Cost of execution of queries SEQ(n,i) and SEQ(n+1,i) are identical except for the COMP1 component of the cost due to the fact that they are accessing relations of different sizes.

From this observation, the following experiment is constructed:

Evaluate SEQ(n,i) and SEQ(N+1, i) using an equality predicate on $C_4$, and observe the cost.

Knowing that the system will choose a sequential scan, solve for the coefficient $CS1_{ss}$.

Rather than using one or two data points, many values must be used to obtain a value for the coefficient such that error is minimized. These observations are discussed below.

Claim 5

Cost of execution of queries SEQ(n,i) and SEQ(n,i+1) are identical except for the COMP2 component of the cost due to the fact that they are selecting different numbers of tuples.

From this observation, the following experiment is constructed:

Evaluate SEQ(n,i) and SEQ(N+1, i) using an equality predicate on $C_4$, and observe the cost.

Knowing that the system will choose a sequential scan, solve for the coefficient $CS2_{ss}$.

Similar experimentation on $C_1$ and $C_3$ can compute the coefficient $CS2_{ci}$ and $CS2_{ui}$ for clustered index and unclustered index respectively. As before, by projecting only the value for $C_1$ with selection for $C_1$, the coefficient $CS2_{io}$ can be computed using a similar procedure above.

Knowing $CS1_{ss}$ and $CS2_{ss}$ for the sequential scan cost formula, CS0ss can be calculated from the respective of the observed cost for SEQ(*,*).

The bifurcation of CS1ss into $CS1_{ss}$io and $CS1_{ss}$cpu is done by scanning a table twice in the same query in the manner specified by the following SQL query:

select t1. C6 from Rn t1, Rn t2
where t1.C6=t2.C6 & t1.C6<c

Note that computing $CS1_{io}$, $CS1_{ci}$ and $CS1_{ui}$ poses a problem. Because these values are expected to be small compared to other components and factoring them to a reasonable degree of accuracy is difficult. So the assumption is made that these coefficients have the same value as $CS2_{ci}$. This is because the main cost of the initial index tree lookup is the amortized I/O cost of fetching the index page. Since the index tree is usually clustered, this cost should be similar to that of fetching the data page for a clustered index, i.e., $CS2_{ci}$. Validation on Allbase, DB2, and Informix corroborated this point of view.

Thus, the coefficients in the cost formulae for selection can be computed using a series of observations from queries.

Observe that similar experiments can be done using $C_2$, $C_5$ and $C_6$ to compute the coefficients for the inequality select operation.

Next the method to determine the cost of ordering a relation is outlined. This is needed in the ordered merge cost formulae. This is done by joining two Rn's, in the manner specified by the following SOL query:

select t1.C4, t2.C4 from Rn1 t1 Rn2 t2 where
t1.C4=t2.C4 & t1.C6+t2.C6<c

Note that the first condition is preferable for as the join condition and C4 does not have an index. Therefore, ordered merge algorithm will be used to compute the join. The output can be varied with the appropriate choice of the constant. Using the observation for queries on one relation with varying size of the output, the constant $CJ2_{mg}$ can be deduced. Further the same query can be computed for three or four values of n and the cost of sorting the relation can be deduced from the knowledge of the cost of sequential scan.

Using the cost formulae for selection and ordering, we can compute the cost of joins without predictability problems.

Theorem

The coefficients of the cost formulae are computed without the unpredictability problems.

Note that the viability of this approach is predicated on the following two assumptions.

Some relations can be stored in the participating DBMS, either as a multidatabase user of the system or if such privilege is not available to the multidatabase user then by special request to the database administrator. These relations are to be used temporarily for calibration and not needed after calibration.

The observed behavior of the queries are repeatable in the sense that the effect of other concurrent processes do not distort the observations.

Practical Calibrations

Using the technique to calculate the coefficients of the cost formulae described above, the three commercial DBMSs: Allbase, DB2, and Informix can be calibrated; i.e., compute the coefficients of the cost formulae. The experiments are set up so as to use mostly single table queries. This is not only because the join queries are time consuming and therefore take too long to calibrate the system, but also because the cost of most join queries can be estimated using those of single table queries. As a validation, various kinds of join queries were run in this Case Study and the estimated cost was compared with the actual observed cost. The result indicateded that the coefficients can be estimated to the extent that subsequent estimation of the join queries were within 20% of actual observations. Here in are the queries posed and the calibrated coefficients.

The systems calibrated were an Allbase DBMS (version HP36217-02A.07.00.17) running on an HP/835 RISC workstation, a DB2 DBMS (version V2.2) running on an IBM 3090 Mainframe and an Informix DBMS (version 4.00.UE2) running on an HP/850 RISC workstation. The calibrations were done at night when DB2 was comparably lightly loaded whereas the Allbase and Informix had no other contender. DB2 and Informix DBMSs were intended for production use and were set up to suit their applications. For that reason as well as to respect the autonomy of that installation, the system parameters were not altered.

Referring to FIG. 9, there are 16 relations used in these calibrations. Each type of relation was instantiated with two sizes of tuples and the smaller tuple relation was duplicated. This duplication is because the join queries required two identical relations. Relations of type $R_{10}$, $R_{13}$, $R_{15}$ and $R_{17}$ were used in the calibration of Allbase and Informix whereas relations of type $R_{13}$, $R_{15}$, $R_{17}$ and $R_{20}$ were used in the calibration of DB2. This choice is dependent on available disk space. The calibration procedure is identical.

Referring next to FIG. 10, the actual queries used in the calibration are given, where Rn is a table of cardinality $2^n$ and c is a constant which determines the selectivity. For each type of query against $R_n$, a set of queries with selectivity $2^{-i}(i=1,2,\ldots,n)$ were constructed and observed.

For each query the elapsed time in the DBMS is recorded. For DB2, the elapsed time is defined as class 2 elapse time. For Allbase and Informix, it is calculated by subtracting the start timestamp (when the query is received) from the end timestamp (when the result has been sent out). In all DBMSs the queries were posed after flushing all the buffers to eliminate the distortion due to buffering. Each query is issued 30 times and the average elapse time is calculated. Except for a few cases, relative error between actual data and average value was within 5% with confidence coefficient of 95%. Thus, the repeatability of the observation was assured.

Figure 13:
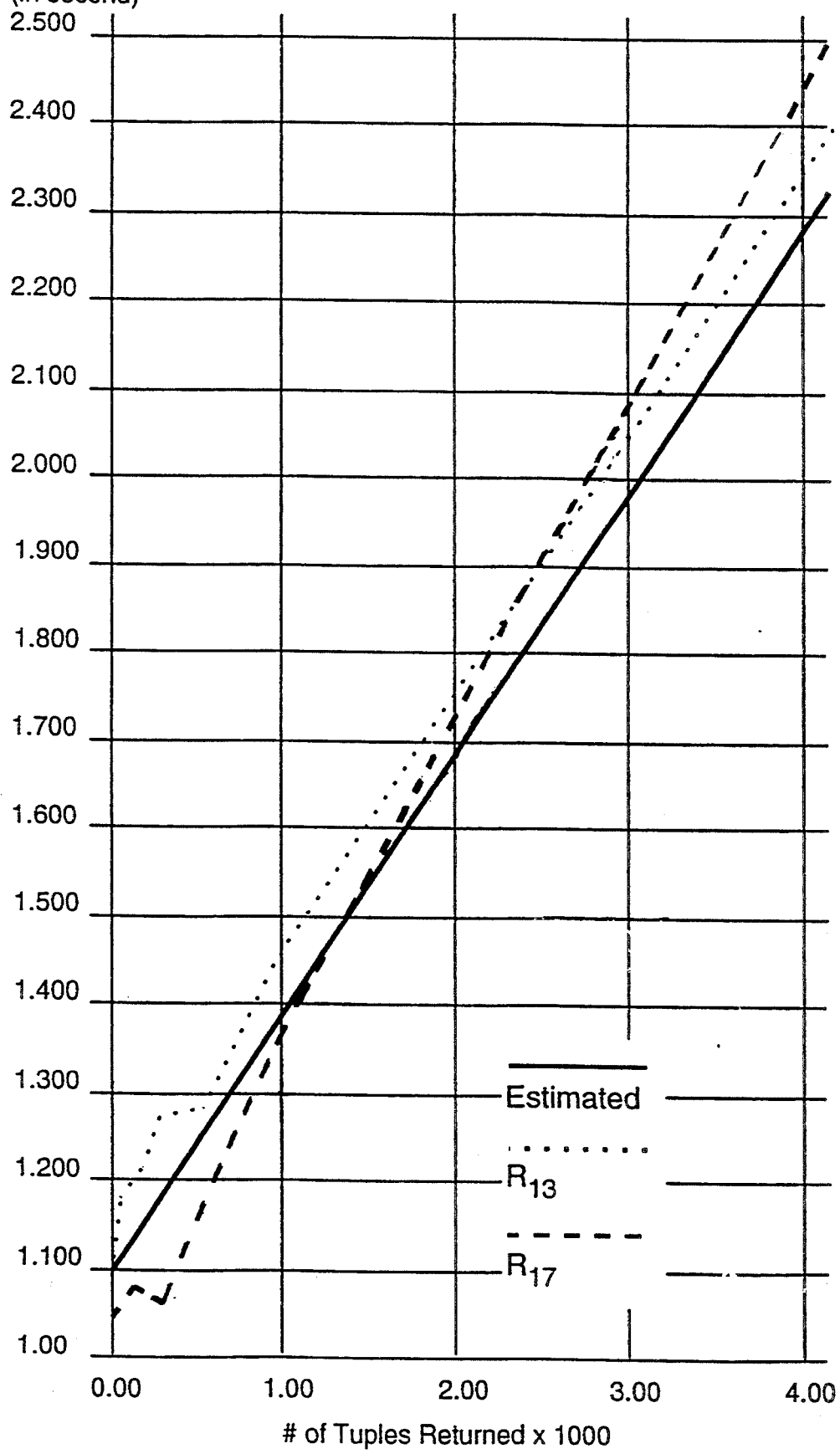
FIG. 13 is a graph of the elapsed time for the test queries running on the DB2 RDBMS for the specified relations and their test joins used in the Case Study which implements the invention.

From these, the coefficients for the cost formulae for Allbase, DB2, and Informix can be deduced. A Least Square Fitting algorithm was used to minimize the errors and estimate the coefficients which are illustrated in FIG. 11. Referring now to FIG. 13, the elapsed time for queries of the type 3.1 running on DB2 for relations $R_{13}$ and $R_{17}$ along with the estimated time by the cost formula, which is independent of the size of the relation, are shown. This corroborates two facts:

1. DB2 access to index only queries are not sensitive to size of the relation;
2. the approximation used for $CS1_{io}$ is not affecting the accuracy.

As can be seen, the error is quite small and this was true for all tests using the queries above.

To explore the effect of multiple selection and projection clauses, the twelve basic queries were modified on DB2. The new queries had up to five predicates and returned up to five attributes. The following are two example queries.

select C1, C2, C3, C4, C5 from Rn where C5<c
select C5 from Rn
where C5<c & C1>=0& C2>=0 & C3>=0 & C4>=0

Note that in the second query, the >=predicates are true for all tuples. This guarantees that they are checked for those and only those tuples that have succeeded with the first (original) predicate.

The result of the experiments shows that in all cases, the differences are within 10%. It seems to suggest that the cost of projecting additional columns is negligible once the tuple is in the memory and the cost to check predicates is also minimal comparing to other processing costs (e.g., I/O).

The above cost formulae were also validated using the 36 types of join queries shown in FIGS. 12A and 12B. Queries of type 1.1–2.9 return $2^{2^i}$ tuples depending on constant c, where i=0,1,..., n. In this validation, joins of selectivity $2^{2^k}$ for k <(n−4) were tested. Queries of type 3.1–4.9 return $2^i$ tuples depending on c, where i<=min(n,m). Joins of selectivity $2^k$ for k<min(n,m)−4 were tested. In both cases, the observed value was compared with the estimated value.

Referring to FIG. 14, the comparison of the estimated value with the observed values for the type 3.1 join queries running on DB2 using pairs of relations R13$^1$ ⋈ R13$^2$, ⋈ R17$^1$ ⋈ R17$^2$ and R13 ⋈ R17. (where ⋈ notates a join) Note that, in this case, the DB2 chooses nested loop as the join method and an index-only access method. Therefore, in all the three cases, the cost should be independent of the cardinality of the two relations. This is observed by referring to the graph shown in FIG. 14 wherein the maximum error is about 10%. Once again this corroborates the cost model and approximations.

Referring to FIG. 15 and FIG. 16, the joins using sort-merge with R17$^1$ ⋈ R17$^2$ and R13⋈R17 on DB2 respectively are illustrated. Note that the estimated cost is once again within 10% error.

The results of this validation proved that in more than 80% of the cases the observed value was within a band of 20% error from the estimated value. Further, in all the other cases the following phenomenon contributed to the majority of the error. All of these cases occurred when the system used unclustered index in the inner loop of the nested loop join. As the cost $CS_{ui}$ is computed as a stand alone query, the potential buffering of pages underestimated the cost of this access in the inner loop of the join where it is competing for buffers with the outer loop. Thus, the estimate was always lower. This is a topic for future improvement.

The approach herein employs a particular cost model. It should be obvious to those skilled in the art that even if the cost model is changed, the approach can still be used to devise a new procedure. Having illustrated and described the principles of the invention in a preferred embodiment thereof, it should be readily apparent to those skilled in the art that the invention can be modified in arrangement and detail without departing from such principles. I claim all modifications coming within the spirit and scope of the following claims.

We claim:

1. A database access system for optimizing database queries in a heterogeneous distributed database system, the system comprising:
   a first database machine incorporating a first relational database management system and accompanying first database;
   a second database machine incorporating a relational database management system and accompanying second database;
   the first and second relational database management systems being different but conforming at least to a predetermined structured query language (SQL);
   communication means for electronic bidirectional communications between the different database machines;
   means coupled to the communication means for sending and receiving an electronic message to and from any of the database machines, the message containing data defining a database query;
   a data access logical cost model comprising logical cost formulae for optimizing queries in each database in the system:
   a synthetic database for use in calibrating the data access logical cost model for each relational database management system in the distributed database system;
   means for querying the synthetic data base on each database machine to determine cost coefficients for use in said logical costs formula to calibrate the data access logical cost model: and
   means responsive to a database query for accessing each of the first and second databases of said first and second database machines in accordance with a least cost index obtained from said data access logical cost model.

2. A system according to claim 1 wherein the means for querying the synthetic database for calibrating a data access logical cost model includes:
   a test suite of SQL queries for querying the synthetic database;
   means for transmitting the test suite of SQL queries from the first database machine to the second database machine and determining cost model data for responses to the SQL queries; and
   a system wide catalog for storing resulting cost model data.

3. A system according to claim 1 wherein the synthetic database for calibrating a data access cost model includes seven columns for any number (n) of relations containing $2^n$ tuples, said columns, 1 through 7, having the attributes including:
   Column$_1$:integer $\{0, n\}$, indexed and clustered;
   Column$_2$:integer $\{0, 2^n-1\}$, indexed and de facto clustered, but not specified to the DBMS as such;
   Column$_3$:integer $\{0, n\}$, indexed and unclustered;
   Column$_4$:integer $\{0, n\}$, having no index;
   Column$_5$:integer $\{0, 2^n-1\}$, indexed and unclustered;
   Column$_6$:integer $\{0, 2^n-1\}$, having no index; and
   Column$_7$:a long character string to meet the size of the tuple requirement.

4. A system according to claim 1 including means defining a space of executions for a database query including a remote join across the first and second database management systems.

5. A system according to claim 1 wherein the data access logical cost model includes means for determining data access cost information based on logical information of the databases including coefficients defined as functions having values comprising a composite cost of CPU utility and input/output overhead.

6. In a system for accessing data in a plurality of relational computer databases on distributed network of database machines, a method of structuring access strategies based on derived cost models for at least two participating database management systems (DBMS), each DBMS having a structured query language (SQL), but differing associated cost models, the method comprising:
   constructing a model database wherein all rows, columns and relational structures are known and controlled;
   conducting a series of access tests on each participating DBMS using said model database;
   deriving access cost data for each participating DBMS according to said access tests;
   storing the access cost data as a logical cost model in a datadictionary/catalog;
   determining an optimum application plan for subsequent distributed database queries relying on the logical cost model stored in said data-dictionary/catalog; and
   executing subsequent queries to return data from the distributed databases in accordance with said optimum application plan.

7. A method according to claim 6 wherein the model database construction step further comprises:
   creating a database wherein for an integer "n," $R_n$ is a relation of seven columns containing $2^n$ tuples,
   each of said seven columns ($C_n$, where n=$\{1..7\}$) having the following attributes:

$C_1$:integer $\{0, n\}$, indexed and clustered;

$C_2$:integer $\{0, 2^n-1\}$, indexed, defacto clustered, but not specified to the DBMS as such;

$C_3$:integer $\{0, n\}$, indexed and unclustered;

$C_4$:integer $\{0, n\}$, having no index;

$C_5$:integer $\{0, 2^n-1\}$, indexed and unclustered;

$C_6$:integer $\{0, 2^n-1\}$, having no index; and $C_7$:a long character string to meet the size of the tuple requirement;

setting the value for the seventh attribute to be a padding field; and setting the multicolumn key for the relation to be $\{C_1, C_2\}$ such that the relation is indexed on this key, in ascending order, with $C_1$ being the major key and $C_2$ being the minor key.

8. A method according to claim 6 wherein the step of conducting a series of access tests further comprises:

applying a minimum of twelve individual queries to each participating DBMS; and posing each query a minimum of thirty times to derive a statistically significant sampling.

9. A method according to claim 6 wherein the step of deriving access cost data further comprises employing a Least Square Fitting algorithm to reduce errors and estimate cost coefficients.

10. A method according to claim 6 including:

structuring the cost model in accordance with a logical execution of the database queries; and estimating the cost of a given query based on logical characteristics of each participating DBMS, logical relations between data stored in the databases, and a logical structure of the query.

11. A method according to claim 10 including estimating the cost of a complex query using a set of primitive queries.

12. A computer system for querying a plurality of databases on a network of database computers comprising:

a data storage means in each of the computers for holding database datadictionaries/catalogs and database access mechanisms;

input and display means connected to each of the computers for inputting database queries to the system and displaying results in human readable format;

communications means for transmitting and receiving queries and results by and between the plurality of database computers;

each computer including a database management system (DBMS) having a DBMS query mechanism for accessing a database in response to a database query:

a cost model including a data-dictionary/catalog containing cost data based on coefficients of composite costs including at least CPU and I/O operations relative to a database query, derived by running each individual database computer's DBMS query mechanism against a model database for each of the tested DBMSs in the network; and means for building query access strategies for each database computer's DBMS based on the cost data stored in said data-dictionary/catalog.

13. A system according to claim 12 in which the cost model includes means defining data access Cost information about communication time between the database computers via the communication means.

14. A system according to claim 12 in which the cost model is structured in accordance with a logical execution of the database queries, including means for estimating the cost of a given query based on logical characteristics of a DBMS, logical relations between data stored in a database, and a logical structure of a query.

15. A system according to claim 12 including:

means for constructing a model database to derive the cost data;

means for running each individual database computer's DBMS query mechanisms against the model database; and means for deriving cost data for each of the tested DBMSs in the network and loading the resulting cost data into the data-dictionary/catalog.

16. A system according to claim 12 in which the means for building query access strategies is operative to construct a query access strategy including a tuple of variable size, and the cost model includes means for estimating a cost of the strategy as a linear function of the size of the tuple.

17. A system according to claim 12 in which the means for building query access strategies is operative to construct a query access strategy including a number of selection and projection clauses, and the cost model includes means for estimating a cost of the strategy as linear functions of the selection and projection clauses.

18. A method of using a programmable system to perform electronic data management among a plurality of electronic relational databases and corresponding DBMSs in a network distributed environment, said programmable system having a plurality of machine components each including a data storage device, a display device, and a communications means for interconnecting the machine components for bidirectional data communications therebetween, the method comprising:

constructing a model database in which all relational structures and components are known and controlled;

running a series of controlled access tests against the model database by each of the plurality of DBMSs in the network;

tracking and recording resulting cost data for each access test;

storing said cost data as a logical cost model in a network datadictionary/catalog file in the data storage device;

determining an optimum application plan for subsequent distributed database queries relying on the logical cost model stored in said data-dictionary/catalog; and executing subsequent queries to return data from the distributed databases in accordance with said optimum application plan.

19. A method according to claim 18 wherein the constructing a model database step further comprises:

setting up a relation of seven columns containing $2^n$ tuples for any integer n such that Column 1 contains integers $\{0, n\}$, indexed and clustered;

Column 2 contains integers $\{0, 2^n-1\}$, indexed and de facto clustered, but not specified to the DBMS as such;

Column 3 contains integers $\{0, n\}$, indexed and unclustered;

Column 4 contains integers $\{0, n\}$, having no index;

Column 5 contains integers $\{0, 2^n-1\}$, indexed and unclustered;

Column 6 contains integers $\{0, 2^n-1\}$, having no index; and

Column 7 contains a long character string to meet the size of the tuple requirement.

20. A method according to claim 18 wherein the tracking and recording step further comprises employing a Least Square Fitting algorithm to reduce errors and estimate cost coefficients.

* * * * *